United States Patent
Deng et al.

(10) Patent No.: US 10,992,875 B2
(45) Date of Patent: Apr. 27, 2021

(54) METHOD AND APPARATUS FOR CONTROLLING INFRARED LAMP, AND FOUR-LENS ADJUSTABLE CAMERA

(71) Applicant: Hangzhou Hikvision Digital Technology Co., Ltd., Zhejiang (CN)

(72) Inventors: Guitao Deng, Zhejiang (CN); Hailong Gao, Zhejiang (CN); Caisheng Yan, Zhejiang (CN); Yan Wu, Zhejiang (CN); Zhan Ye, Zhejiang (CN); Peng Xu, Zhejiang (CN); Yang Li, Zhejiang (CN); Zhiqiang Rong, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/767,447

(22) PCT Filed: Dec. 26, 2018

(86) PCT No.: PCT/CN2018/123954
§ 371 (c)(1),
(2) Date: May 27, 2020

(87) PCT Pub. No.: WO2019/129083
PCT Pub. Date: Jul. 4, 2019

(65) Prior Publication Data
US 2020/0389584 A1 Dec. 10, 2020

(30) Foreign Application Priority Data

Dec. 27, 2017 (CN) .......................... 201721872513.7
Apr. 4, 2018 (CN) .......................... 201820481642.1
May 23, 2018 (CN) .......................... 201810501412.1

(51) Int. Cl.
*H04N 5/235* (2006.01)
*H04N 5/225* (2006.01)

(52) U.S. Cl.
CPC .......... *H04N 5/2354* (2013.01); *H04N 5/2254* (2013.01); *H04N 5/2256* (2013.01); *H04N 5/2351* (2013.01)

(58) Field of Classification Search
CPC ... H04N 5/2351; H04N 5/2354; H04N 5/2256
See application file for complete search history.

(56) References Cited

U.S. PATENT DOCUMENTS

| 2013/0002882 A1 | 1/2013 | Onozawa et al. |
| 2015/0157930 A1 | 6/2015 | Emori |
(Continued)

FOREIGN PATENT DOCUMENTS

| CN | 201464696 U | 5/2010 |
| CN | 101846528 A | 9/2010 |
(Continued)

*Primary Examiner* — Jayanti K Patel
*Assistant Examiner* — Christopher Kingsbury Glover
(74) *Attorney, Agent, or Firm* — Peter W. Schroen; Bret E. Field; Bozicevic, Field & Francis LLP

(57) ABSTRACT

A method and an apparatus for controlling an infrared lamp and a four-lens adjustable camera are provided. Aspects of the disclosure include determining, for each of a plurality of lenses of a four-lens adjustable camera, a brightness change rate between a picture captured by the lens when a first infrared lamp group is not turned on and a picture captured by the lens when the first infrared lamp group is turned on. Embodiments of the invention further include determining a lens with a largest brightness change rate among the plurality of lenses as a lens bound to the first infrared lamp group. Aspects of the present application improve the light compensation effect of the first infrared lamp group on the premise that the first infrared lamp group is fixed.

9 Claims, 16 Drawing Sheets

(56) References Cited

U.S. PATENT DOCUMENTS

| | | | |
|---|---|---|---|
| 2016/0366346 A1* | 12/2016 | Shin | G06K 9/00771 |
| 2017/0104939 A1* | 4/2017 | Sun | H04N 5/2354 |
| 2017/0302837 A1 | 10/2017 | Sakai | |
| 2018/0020145 A1* | 1/2018 | Kotfis | G06Q 10/087 |
| 2019/0122355 A1* | 4/2019 | Xu | G06K 9/00771 |
| 2019/0246025 A1* | 8/2019 | Duran | H04N 5/3572 |

FOREIGN PATENT DOCUMENTS

| | | |
|---|---|---|
| CN | 101872106 A | 10/2010 |
| CN | 101923402 A | 12/2010 |
| CN | 103118232 A | 5/2013 |
| CN | 106331519 A | 1/2017 |
| CN | 206181179 U | 5/2017 |
| CN | 206481397 U | 9/2017 |
| EP | 3094081 A1 | 11/2016 |
| WO | WO2010044185 A1 | 4/2010 |

\* cited by examiner

METHOD AND APPARATUS FOR CONTROLLING INFRARED LAMP, AND FOUR-LENS ADJUSTABLE CAMERA

The present application claims the priority to a Chinese Patent Application No. 201810501412.1, filed with the China National Intellectual Property Administration on May 23, 2018 and entitled "Method and apparatus for controlling infrared lamp, and four-lens adjustable camera", a Chinese Patent Application No. 201820481642.1, filed with the China National Intellectual Property Administration on Apr. 4, 2018, and entitled "Multi-lens camera and apparatus for adjusting lenses of the same", and a Chinese Patent Application No. 201721872513.7, filed with the China National Intellectual Property Administration on Dec. 27, 2017 and entitled "Multi-lens camera and apparatus for adjusting lenses of the same", which are incorporated herein by reference in their entirety.

TECHNICAL FIELD

The present application relates to the technical field of network camera, and in particular to a method and apparatus for controlling an infrared lamp and a four-lens adjustable camera.

BACKGROUND

In practical work, for scenes with darker lights such as cloudy days, nights or places with insufficient light, a multi-lens camera with multiple lenses may monitor these scenes by infrared light lenses. In order to obtain a clearer image, the infrared lamp light compensation may be performed on the infrared light lenses.

In the prior art, to perform the infrared lamp light compensation on the infrared lenses in the multi-lens camera, an infrared lamp group may be pre-disposed for each infrared lens. When the infrared lamp light compensation needs to be performed on one lens, the pre-disposed infrared lamp group corresponding to the lens are turned on and then emit infrared light, so as to enable a light intensity enhancement in a scene where the infrared light can be reach, and thus obtain a clearer image.

In a multi-lens adjustable camera in which positions of a plurality of infrared lenses is manually adjustable, the positions of the plurality of infrared lenses may be adjusted according to actual requirements, and the scenes monitored by the infrared lenses may be changed according to the adjustment. However, the infrared lamp group can't move with the infrared lenses due to optics and heat dissipation. Therefore, after the adjustment, an overlapped area between the scenes that monitored by the infrared lenses and the scenes that can be illuminated by the pre-disposed infrared lamp group is relatively small, which leads to a poor light compensation on the infrared lenses by the pre-disposed infrared lamp group.

SUMMARY

The object of the present application is to provide a method for controlling an infrared lamp, so as to improve the light compensation effect of infrared lamp groups in a four-lens adjustable camera. The specific technical solution is as follows.

The object of the present application is to provide a method for controlling an infrared lamp, so as to improve the light compensation effect of infrared lamp groups in a four-lens adjustable camera. The specific technical solution is as follows.

In a first aspect, an embodiment of the present application provides a method for controlling an infrared lamp, including:

determining, for each of a plurality of lenses of the four-lens adjustable camera, a brightness change rate between a picture captured by the lens when a first infrared lamp group is not turned on and a picture captured by the lens when the first infrared lamp group is turned on, the first infrared lamp group being one infrared lamp group in the four-lens adjustable camera; and determining a lens with a largest brightness change rate among the plurality of lenses as a lens bound to the first infrared lamp group.

With respect to the first aspect, in a first possible implementation, the step of determining, for each of a plurality of lenses of the four-lens adjustable camera, a brightness change rate between a picture captured by the lens when a first infrared lamp group is not turned on and a picture captured by the lens when the first infrared lamp group is turned on, includes:

turning off all infrared lamp groups in the four-lens adjustable camera;

determining, for each of the plurality of lenses, a brightness of a picture captured by the lens when all of the infrared lamp groups are not turned on as a brightness without light compensation of the lens;

turning on the first infrared lamp group;

determining, for each of the plurality of lenses, a brightness of a picture captured by the lens when the first infrared lamp group is turned on as a brightness with light compensation of the lens; and calculating, for each of the plurality of lenses, a change rate of the brightness with light compensation of the lens relative to the brightness without light compensation of the lens as a brightness change rate of the lens.

With respect to the first possible implementation of the first aspect, in a second possible implementation, after determining, for each of the plurality of lenses, the brightness of the picture captured by the lens when all of the infrared lamp groups are not turned on as the brightness without light compensation of the lens, the method further includes:

calculating, for each of the plurality of lenses, a variance of the brightness of the picture captured by the lens in unit time when all of the infrared lamp groups are not turned on as a brightness variance without light compensation of the lens;

initializing the plurality of lenses and performing the step of turning off all infrared lamp groups in the four-lens adjustable camera if a lens whose brightness variance without light compensation is larger than a first preset variance threshold exists among the plurality of lenses; and continuing to perform the step of turning on the first infrared lamp group if no lens whose brightness variance without light compensation is larger than the first preset variance threshold exists among the plurality of lenses.

With respect to the first possible implementation of the first aspect, in a third possible implementation, after determining, for each of the plurality of lenses, the brightness of the picture captured by the lens when the first infrared lamp group is turned on as the brightness with light compensation of the lens, the method further includes:

calculating, for each of the plurality of lenses, a variance of the brightness of the picture captured by the lens in unit time when the first infrared lamp group is turned on as a brightness variance with light compensation of the lens;

initializing the plurality of lenses and performing the step of turning off all infrared lamp groups in the four-lens adjustable camera if a lens whose brightness variance with light compensation is larger than a second preset variance threshold exists among the plurality of lenses; and continuing to perform the step of calculating, for each of the plurality of lenses, a change rate of the brightness with light compensation of the lens relative to the brightness without light compensation of the lens as a brightness change rate of the lens, if no lens whose brightness variance with light compensation is larger than the second preset variance threshold exists among the plurality of lenses.

With respect to the first aspect, in a fourth possible implementation, after determining, for each of the plurality of lenses of the four-lens adjustable camera, the brightness change rate between the picture captured by the lens when the first infrared lamp group is not turned on and the picture captured by the lens when the first infrared lamp group is turned on, the method further includes:

determining whether a largest brightness change rate of the brightness change rates of the plurality of lenses is larger than a sum of a smallest brightness change rate and a second smallest brightness change rate of the brightness change rates;

if the largest brightness change rate is larger than the sum of the smallest brightness change rate and the second smallest brightness change rate, initializing the plurality of lenses and performing the step of determining, for each of a plurality of lenses of the four-lens adjustable camera, a brightness change rate between a picture captured by the lens when a first infrared lamp group is not turned on and a picture captured by the lens when the first infrared lamp group is turned on; and if the largest brightness change rate is not larger than the sum of the smallest brightness change rate and the second smallest brightness change rate, continuing to perform the step of determining a lens with a largest brightness change rate among the plurality of lenses as a lens bound to the first infrared lamp group.

With respect to any one of the second possible implementation to the fourth possible implementation in the first aspect, in a fifth possible implementation, initializing the plurality of lenses includes:

stowing infrared filters of the plurality of lenses; and
initializing gains and shutter speeds of the plurality of lenses.

With respect to the first implementation in the first aspect, in a sixth possible implementation, the step of determining, for each of the plurality of lenses, a brightness of a picture captured by the lens when all infrared lamp groups are not turned on as a brightness without light compensation of the lens, includes:

determining, for each of the plurality of lenses, an average brightness of all bayer image frames captured by the lens in unit time when all of the infrared lamp groups are not turned on as the brightness without light compensation of the lens;

the step of determining, for each of the plurality of lenses, a brightness of a picture captured by the lens when the first infrared lamp group is turned on as a brightness with light compensation of the lens, includes:

determining, for each of the plurality of lenses, an average brightness of all bayer image frames captured by the lens in unit time when the first infrared lamp group is turned on as the brightness with light compensation of the lens.

In a second aspect, an embodiment of the present application provides an apparatus for controlling an infrared lamp, including:

a brightness calculating module configured for determining, for each of a plurality of lenses of the four-lens adjustable camera, a brightness change rate between a picture captured by the lens when a first infrared lamp group is not turned on and a picture captured by the lens when the first infrared lamp group is turned on, the first infrared lamp group being one infrared lamp group in the four-lens adjustable camera; and a binding module configured for determining a lens with a largest brightness change rate among the plurality of lenses as a lens bound to the first infrared lamp group.

With respect to the second aspect, in a first possible implementation, the brightness calculating module is specifically configured for:

turning off all infrared lamp groups in the four-lens adjustable camera;

determining, for each of the plurality of lenses, a brightness of a picture captured by the lens when all of the infrared lamp groups are not turned on as a brightness without light compensation of the lens;

turning on the first infrared lamp group;

determining, for each of the plurality of lenses, a brightness of a picture captured by the lens when the first infrared lamp group is turned on as a brightness with light compensation of the lens; and calculating, for each of the plurality of lenses, a change rate of the brightness with light compensation of the lens relative to the brightness without light compensation of the lens as a brightness change rate of the lens.

With respect to the first possible implementation of the second aspect, in a second possible implementation, the brightness calculating module is further configured for: after determining, for each of the plurality of lenses, the brightness of the picture captured by the lens when all of the infrared lamp groups are not turned on as the brightness without light compensation of the lens, calculating, for each of the plurality of lenses, a variance of the brightness of the picture captured by the lens in unit time when all of the infrared lamp groups are not turned on as a brightness variance without light compensation of the lens;

initializing the plurality of lenses and performing the turning off all infrared lamp groups in the four-lens adjustable camera if a lens whose brightness variance without light compensation is larger than a first preset variance threshold exists among the plurality of lenses; and continuing to perform the turning on the first infrared lamp group if no lens whose brightness variance without light compensation is larger than the first preset variance threshold exists among the plurality of lenses.

With respect to the first possible implementation of the second aspect, in a third possible implementation of the second aspect, the brightness calculating module is further configured for: after determining, for each of the plurality of lenses, the brightness of the picture captured by the lens when the first infrared lamp group is turned on as the brightness with light compensation of the lens, calculating a variance of brightness of the pictures captured by the plurality of lenses in unit time when the first infrared lamp group is turned on as a brightness variance with light compensation;

calculating, for each of the plurality of lenses, a variance of the brightness of the picture captured by the lens in unit time when the first infrared lamp group is turned on as a brightness variance with light compensation of the lens;

initializing the plurality of lenses and performing the turning off all infrared lamp groups in the four-lens adjustable camera if a lens whose brightness variance with light compensation is larger than a second preset variance threshold exists among the plurality of lenses; and continuing to perform the calculating, for each of the plurality of lenses, a change rate of the brightness with light compensation of the lens relative to the brightness without light compensation of the lens as a brightness change rate of the lens, if no lens whose brightness variance with light compensation is larger than the second preset variance threshold exists among the plurality of lenses.

With respect to the first possible implementation of the second aspect, in a fourth possible implementation, the brightness calculating module is further configured for: after determining, for each of the plurality of lenses of the four-lens adjustable camera, the brightness change rate between the picture captured by the lens when the first infrared lamp group is not turned on and the picture captured by the lens when the first infrared lamp group is turned on, determining whether a largest brightness change rate of the brightness change rates of the plurality of lenses is larger than a sum of a smallest brightness change rate and a second smallest brightness change rate of the brightness change rates;

if the largest brightness change rate is larger than the sum of the smallest brightness change rate and the second smallest brightness change rate, initializing the plurality of lenses and performing the determining, for each of a plurality of lenses of the four-lens adjustable camera, a brightness change rate between a picture captured by the lens when a first infrared lamp group is not turned on and a picture captured by the lens when the first infrared lamp group is turned on; and if the largest brightness change rate is not larger than the sum of the smallest brightness change rate and the second smallest brightness change rate, continuing to perform the determining a lens with a largest brightness change rate among the plurality of lenses as a lens bound to the first infrared lamp group.

With respect to any one of the second possible implementation to the fourth possible implementation in the second aspect, in a fifth possible implementation, the brightness calculating module is specifically configured for:

stowing infrared filters of the plurality of lenses; and
initializing gains and shutter speeds of the plurality of lenses.

With respect to the first possible implementation of the second aspect, in a sixth possible implementation, the brightness calculating module is specifically configured for:

determining, for each of the plurality of lenses, an average brightness of all bayer image frames captured by the lens in unit time when all of the infrared lamp groups are not turned on as the brightness without light compensation of the lens; and determining, for each of the plurality of lenses, an average brightness of all bayer image frames captured by the lens in unit time when the first infrared lamp group is turned on as the brightness with light compensation of the lens.

In a third aspect, an embodiment of the present application provides a four-lens adjustable camera, including:

four lenses, four infrared lamp groups, a master processor, a slave processor, and an exchanging module.

The four lenses are movably mounted to the four-lens adjustable camera. Two of the four lenses are electrically connected to the master processor, and the other two lenses are electrically connected to the slave processor.

Two of the four infrared lamp groups are electrically connected to the master processor, and the other two infrared lamp groups are electrically connected to the slave processor.

The exchanging module is electrically connected to the master processor and the slave processor and is configured to exchange information between the master processor and the slave processor.

The master processor is configured to control the two lenses and the two infrared lamp groups electrically connected to the master processor, and send a control instruction to the slave processor. The slave processor is configured to control the two lenses and the two infrared lamp groups electrically connected to the slave processor according to the control instruction.

The master processor is further configured to control the four-lens adjustable camera to perform the following steps:

determining, for each of the four lenses, a brightness of a picture captured by the lens when the four infrared lamp groups are not turned on as a brightness without light compensation of the lens;

determining, for each of the four lenses, a brightness of a picture captured by the lens when only a first infrared lamp group among the four infrared lamp groups is turned on as a brightness with light compensation of the lens, the first infrared lamp group being one of the four infrared lamp groups;

calculating, for each of the four lenses, a change rate of the brightness with light compensation of the lens relative to the brightness without light compensation of the lens as a brightness change rate of the lens; and determining a lens with a largest brightness change rate among the four lenses as a lens bound to the first infrared lamp group.

In a fourth aspect, an embodiment of the present application provides a four-lens adjustable camera, including:

a plurality of lenses, a plurality of infrared lamp groups, and a control apparatus.

The plurality of lenses are movably mounted into the four-lens adjustable camera.

The plurality of infrared lamp groups are configured to perform infrared light compensation on the four lenses.

The control apparatus includes at least one processor for controlling the four-lens adjustable camera to perform any one of the methods of the first aspect; determining whether the plurality of infrared lamp groups are to be turned on according to working modes of the plurality of lenses and a binding relationship between the plurality of lenses and the infrared lamp groups, to obtain a determination result for the plurality of infrared lamp groups; and controlling the turn-on and turn-off of the plurality of infrared lamp groups according to the determination result.

In a fifth aspect, an embodiment of the present application provides a computer-readable storage medium having stored a computer program thereon, wherein the computer program is executed by the processor so as to cause the processor to perform any one of the methods.

The method and apparatus for controlling an infrared lamp and four-lens adjustable camera according to the embodiments of the present application, after the lenses in the four-lens adjustable camera are adjusted completely, can automatically select a lens with the best light compensation effect according to the effect of light compensations on the plurality of lenses by the first infrared lamp group as a lens bound to the first infrared lamp group, so as to improve the light compensation effect provided by the first infrared lamp group in case the position of the first infrared lamp group is fixed. Of course, any of products or methods of the present application does not necessarily need to achieve all advantages described above at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The technical solutions in the embodiments of the present application will be described clearly and completely in conjunction with the drawings in the embodiments of the present application. Obviously, the described embodiments are only a part, not all, of the embodiments of the present application. Based on the embodiments in the present application, all other embodiments obtained by those skilled in the art without any creative work will fall within the scope of protection of this application.

Figure 1:
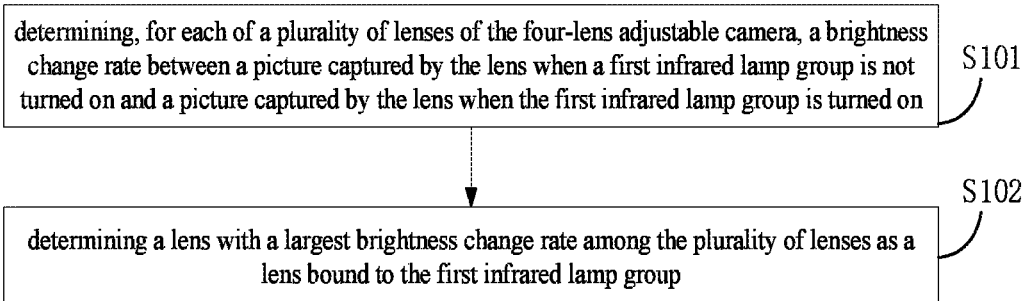
FIG. 1 is a flowchart of a method for controlling an infrared lamp that is applied to a four-lens adjustable camera according to an embodiment of the present application.

FIG. 1 is a flowchart of a method for controlling an infrared lamp according to an embodiment of the present application. The method is applicable to a four-lens adjustable camera, and may include the following steps.

S101, determining, for each of a plurality of lenses of a four-lens adjustable camera, a brightness change rate between a picture captured by the lens when a first infrared lamp group is not turned on and a picture captured by the lens when the first infrared lamp group is turned on, the first infrared lamp group is one infrared lamp group in the four-lens adjustable camera.

The plurality of infrared lamp groups are disposed on the four-lens adjustable camera. Each infrared lamp group includes one or more infrared lamps. For each of the plurality of lenses of the four-lens adjustable camera, a picture captured when the first infrared lamp group is not turned on and a picture captured when the first infrared lamp group is turned on may be regarded as a set of comparison pictures. In order to make the brightness change rate reflect the effect of light compensation on each lens by the first infrared lamp group as accurate as possible, there should be no other variables except for a variable indicative of whether the first infrared lamp group is turned on or turned off in capturing the two pictures.

Further, in the embodiment, the step may be performed after the adjustment of the plurality of lenses of the four-lens adjustable camera. The adjustment may be referred to the adjustment of a direction of an optical axis of a lens, the adjustment of a position of the lens, or the adjustment of the direction of the optical axis of the lens and the position of the lens. It can be understood that, after the adjustment of the lenses of the four-lens adjustable camera, the effect of light compensation on a lens that is originally bound to the first infrared lamp group by the first infrared lamp group may change. For example, the effect of light compensation on the lens that is originally bound to the first infrared lamp group by the first infrared lamp group may be worse than the effect of light compensations on other lenses by the first infrared lamp group. At this time, it is required to rebind a lens to the first infrared lamp group to improve the light compensation effect of the first infrared lamp group. For example, the first infrared lamp group is originally bound to a first lens. After the adjustment of the first lens, the effect of light compensation on the first lens by the first infrared lamp group may be worse than the effect of light compensation on a second lens by the first infrared lamp group. Therefore, to improve the light compensation effect of the first infrared lamp group, the first infrared lamp group may be bound to the second lens.

S102, determining a lens with a largest brightness change rate among the plurality of lenses as a lens bound to the first infrared lamp group.

The binding of a lens to the first infrared lamp group means that when the infrared lamp light compensation needs to be performed on the lens, the first infrared lamp group is turned on to perform light compensation on the lens. In the embodiment, a plurality of infrared lamp groups may be bound to a lens. In this case, to perform the infrared lamps light compensation on the lens, the plurality of infrared lamp groups bound to the lens are turned on simultaneously.

The fact that a lens has a largest brightness change rate may be understood that the first infrared lamp group produces a better light compensation effect for the lens than other lenses in the four-lens adjustable camera. The light compensation effect of the first infrared lamp group can be maximized by determining this lens as a lens bound to the first infrared lamp group.

Figure 2:
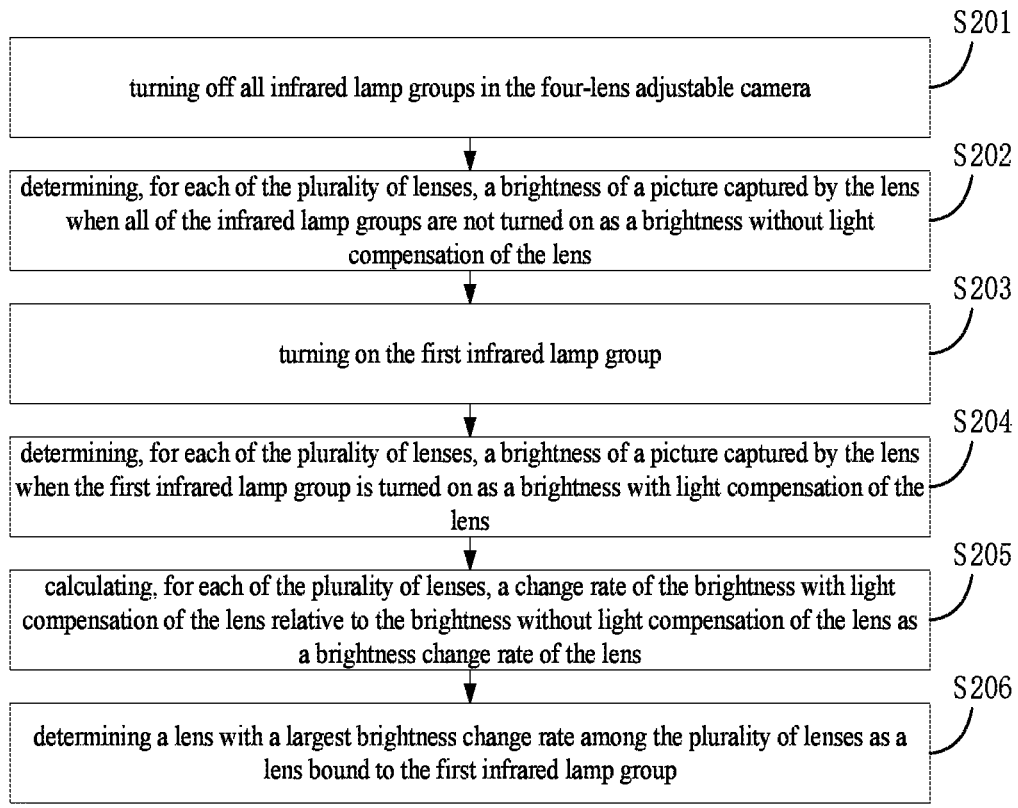
FIG. 2 is another flowchart of a method for controlling an infrared lamp that is applied to a four-lens adjustable camera according to an embodiment of the present application.

FIG. 2 is another flowchart of a method for controlling an infrared lamp according to an embodiment of the present application. The method may include the following steps.

S201, turning off all infrared lamp groups in the four-lens adjustable camera.

A signal source for controlling the infrared lamp groups may output a low voltage level to each infrared lamp in all infrared lamp groups, or the signal source for controlling the infrared lamp groups may stop outputting a signal to each infrared lamp in all infrared lamp groups. At this time, there is no a current passing through each infrared lamp, and thus each infrared lamp is in a turn-off state.

S202, determining, for each of the plurality of lenses, a brightness of a picture captured by the lens when all infrared lamp groups are not turned on as a brightness without light compensation of the lens.

The brightness without light compensation of one lens may be the brightness of an image frame captured by the lens at a moment. Optionally, the brightness without light compensation of the lens may also be an average brightness of all bayer image frames captured by the lens in unit time.

For example, four lenses in the four-lens adjustable camera are respectively a first lens, a second lens, a third lens, and a fourth lens. According to the brightness of each bayer image frame (it is assumed 60 frames in total) captured by the first lens within one second, an average value of the brightness of the 60 bayer image frames can be calculated, to obtain a brightness without light compensation $X_1$ of the first lens. Similarly, a brightness without light compensation $X_2$ of the second lens, a brightness without light compensation $X_3$ of the third lens and a brightness without light compensation $X_4$ of the fourth lens are respectively calculated and obtained according to the step for calculating $X_1$.

It can be understood that a sequence of calculating the four brightness values without light compensation can be set according to actual requirements, or the four brightness values without light compensation can be concurrently calculated and obtained with a permitted calculating capability of the device. It can be understood that there may be fluctuations in the brightness of an image captured by a lens. If the brightness of one image frame captured by the lens is used as the brightness without light compensation, an error may occur due to the fluctuations. The use of an average value of the brightness of a plurality of image frames as the brightness without light compensation can effectively reduce the error caused by the brightness fluctuations.

S203, turning on the first infrared lamp group.

Specifically, a control signal source may output a high voltage level signal with a predetermined duty cycle to the first infrared lamp group. The first infrared lamp group is turned on as being induced by the high voltage level signal.

S204, determining, for each of the plurality of lenses, a brightness of a picture captured by the lens when the first infrared lamp group is turned on as a brightness with light compensation of the lens.

At this time, only the first infrared lamp group in the plurality of infrared lamp groups of the four-lens adjustable camera is turned on, and other infrared lamp groups except for the first infrared lamp group are turned off. The brightness with light compensation of a lens may be a brightness of an image frame captured by the lens at a moment. Optionally, the brightness with light compensation may be an average brightness of all bayer image frames captured by the lens in unit time.

For example, according to the brightness of each bayer image frame (it is assumed 60 frames in total) captured by the first lens within 1s, an average value of the brightness of the 60 bayer image frames may be calculated, to obtain the brightness with light compensation $Y_1$ of the first lens. Similarly, the brightness with light compensation $Y_2$ of the second lens, the brightness with light compensation $Y_3$ of the third lens and the brightness with light compensation $Y_4$ of the fourth lens are respectively calculated and obtained according to the step for calculating $Y_1$. It can be understood that a sequence of calculating the four brightness values without light compensation can be set according to actual requirements, or the four brightness values with light compensation can be concurrently calculated and obtained with a permitted calculating capability for the device.

S205, calculating, for each of the plurality of lenses, a change rate of the brightness with light compensation of the lens relative to the brightness without light compensation of the lens as a brightness change rate of the lens.

The larger a ratio between the brightness with light compensation and the brightness without light compensation of a lens is, the larger the brightness change rate of the lens is. The smaller the ratio between the brightness with light compensation and the brightness without light compensation of the lens is, the smaller the brightness change rate of the lens is. In an optional embodiment, a formula for calculating the brightness change rate of a lens is as follows:

$$Z = \frac{Y - X}{X}$$

where, Z is the brightness change rate of the lens, Y is the brightness with light compensation of the lens, X is the brightness without brightness of the lens. The brightness change rate of each lens in the four-lens adjustable camera should be calculated by the same formula.

S206, determining a lens with a largest brightness change rate among the plurality of lenses as a lens bound to the first infrared lamp group.

The step is the same with S102. A reference may be made to the description on S102, which will not be repeated here.

Ideally, the four-lens adjustable camera may be provided with four infrared lamp groups, which are respectively bound to four lenses in the four-lens adjustable camera. In this case, each infrared lamp group can be maximized. In this embodiment, the brightness without light compensation is determined when all infrared lamp groups in the four-lens adjustable camera are not turned on, while the brightness with light compensation is determined when only the first infrared lamp group is turned on. The calculating of the brightness change rate based on the two brightness values can prevent interference from infrared lamp groups other than the first infrared lamp group, thus accurately reflecting the effect of light compensations on the plurality of lenses by the first infrared lamp group alone.

Figure 3:
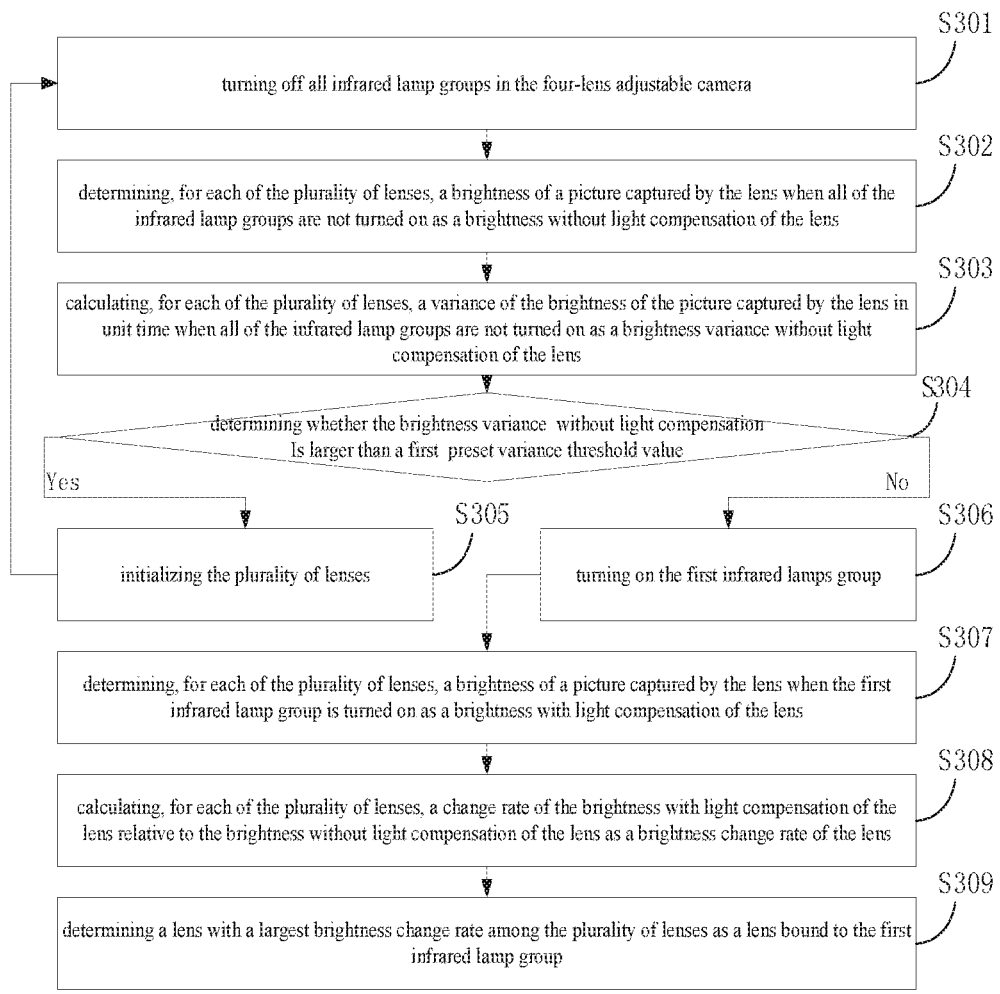
FIG. 3 is another flowchart of a method for controlling an infrared lamp that is applied to a four-lens adjustable camera according to an embodiment of the present application.

In an optional embodiment, as shown in FIG. 3, the method may include the followings steps.

S301, turning off all infrared lamp groups in the four-lens adjustable camera.

The step is the same with S201. A reference may be made to the description on S201, which will not be repeated here.

S302, determining, for each of the plurality of lenses, a brightness of a picture captured by the lens when all infrared lamp groups are not turned on as a brightness without light compensation of the lens.

The step is the same with S202. A reference may be made to the description on S202, which will not be repeated here.

S303, calculating, for each of the plurality of lenses, a variance of brightness of a picture captured by the lens in unit time when all the infrared lamp groups are not turned on as a brightness variance without light compensation of the lens;

For each of the plurality of lenses, the variance of brightness of bayer image frames (for example, 60 frames) captured by the lens within 1 second when all infrared lamp groups are not turned on may be calculated.

S304, determining whether the brightness variance without light compensation is larger than a first preset variance threshold; if the brightness variance without light compensation is larger than the first preset variance threshold, performing S305; and if the brightness variance without light compensation is not larger than the first preset variance threshold, performing S306.

S305, initializing the plurality of lenses, and performing S301.

The initializing means restoring the plurality of lenses in the four-lens adjustable camera to a preset default state. In an optional embodiment, initializing the plurality of lenses may include: stowing infrared filters of the plurality of lenses and initializing the gain and the shutter speed of the plurality of lenses.

The infrared filter is a filter for filtering infrared light. The infrared filter does not filter or hardly filters light in the visible light wave band. When the infrared filter is stowed, infrared light can pass normally, thus a sensor in an image acquisition unit to which a lens belongs can sense infrared light. The gain indicates a magnification of a signal sensed by the sensor. The shutter speed indicates an effective time length of opening the shutter. The faster the shutter speed is, the shorter the exposure time of each video frame captured by the lens is.

It can be understood that, in case an infrared filter of a lens is not stowed, because the infrared filter can filter infrared light, a sensor in an image acquisition unit to which a lens belongs can't sense the infrared light and thus the brightness of a picture captured by the lens may be abnormal. The gain and shutter speed of the lens each directly affects the brightness of the picture captured by the lens. Too large or too small gain and shutter speed may cause the abnormal brightness of the picture captured by the lens.

S306, turning on the first infrared lamp group.

The step is the same with S203. A reference may be made to the description on S203, which will not be repeated here.

S307, determining, for each of the plurality of lenses, a brightness of a picture captured by the lens when the first infrared lamp group is turned on as a brightness with light compensation of the lens.

The step is the same with S204. A reference may be made to the description on S204, which will not be repeated here.

S308, calculating, for each of the plurality of lenses, a change rate of the brightness with light compensation of the lens relative to the brightness without light compensation of the lens as a brightness change rate of the lens.

The step is the same with S205. A reference may be made to the description on S205, which will not be repeated here.

S309, determining a lens with a largest brightness change rate among the plurality of lenses as a lens bound to the first infrared lamp group.

The step is the same with S102. A reference may be made to the description on S102, which will not be repeated here.

A variance of brightness of a picture captured by a lens in unit time may represent a stability of the brightness of the picture captured by the lens in unit time. The larger the variance is, the more unstable the brightness of the picture captured by the lens in unit time is. If the brightness variance without light compensation is larger than the first preset variance threshold, it is indicated that the stability of the brightness of the picture captured by the lens is worse, the brightness of the picture captured by the lens may be abnormal, and the accuracy of the obtained brightness without light compensation is low. In contrast, if the variance is not larger than the first preset variance threshold, it is indicated that the brightness of the picture captured by the lens in unit time is relatively stable, the brightness of the picture captured by the lens is normal, and the accuracy of the obtained brightness without light compensation is high. Therefore, by this embodiment, the accuracy of the brightness without light compensation can be improved.

Figure 4:
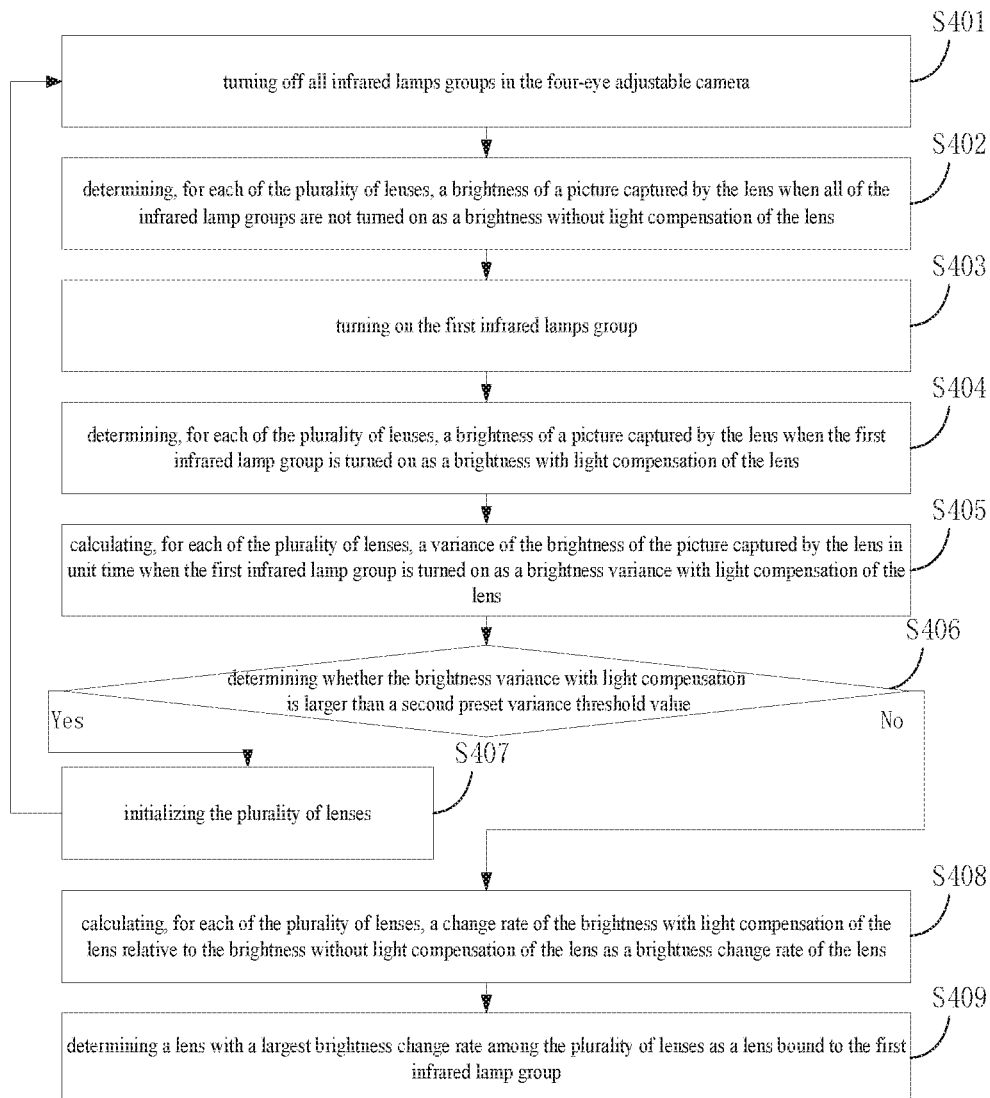
FIG. 4 is another flowchart of a method for controlling an infrared lamp that is applied to the four-lens adjustable camera according to an embodiment of the present application.

FIG. 4 is another flowchart of a method for determining a brightness change rate according to an embodiment of the present application. The method may include the followings steps.

S401, turning off all infrared lamp groups in the four-lens adjustable camera.

The step is the same with S201. A reference may be made to the description on S201, which will not be repeated here.

S402, determining, for each of the plurality of lenses, a brightness of a picture captured by the lens when all infrared lamp groups are not turned on as a brightness without light compensation of the lens.

The step is the same with S202. A reference may be made to the description on S202, which will not be repeated here.

S403, turning on the first infrared lamp group.

The step is the same with S203. A reference may be made to the description on S203, which will not be repeated here.

S404, determining, for each of the plurality of lenses, a brightness of a picture captured by the lens when the first infrared lamp group is turned on as a brightness with light compensation of the lens.

The step is the same with S204. A reference may be made to the description on S204, which will not be repeated here.

S405, calculating, for each of the plurality of lenses, a variance of the brightness of the picture captured by the lens in unit time when the first infrared lamp group is turned on as a brightness variance with light compensation of the lens.

S406, determining whether the brightness variance with light compensation is larger than a second preset variance threshold; if the brightness variance with light compensation is larger than the second preset variance threshold, performing S407; if the brightness variance with light compensation is not larger than the second preset variance threshold, performing S408.

The second preset variance threshold may be set according to actual requirements, and may or may not be equal to the first preset variance threshold.

S407, initializing the plurality of lenses and performing S401.

Specifically, a reference may be made to the description regarding initializing the plurality of lenses in S307, which will not be repeated here.

S408, calculating, for each of the plurality of lenses, a change rate of the brightness with light compensation of the lens relative to the brightness without light compensation of the lens as a brightness change rate of the lens.

The step is the same with S308. A reference may be made to the description regarding S308, which will not be repeated here.

S409, determining a lens with a largest brightness change rate among the plurality of lenses as a lens bound to the first infrared lamp group.

The step is the same with S102. A reference may be made to the description regarding S102, which will not be repeated here.

If the brightness variance with light compensation is larger than the second preset variance threshold, it is indicated that the accuracy of the brightness with light compensation in S404 and the brightness without light compensation in S402 is low. If the brightness variance with light compensation is not larger than the second preset variance threshold, it is indicated that the accuracy of the brightness with light compensation in S404 and the brightness without light compensation in S402 is high. Therefore, by this embodiment, the accuracy of the brightness with light compensation and the brightness without light compensation can be improved.

Figure 5:
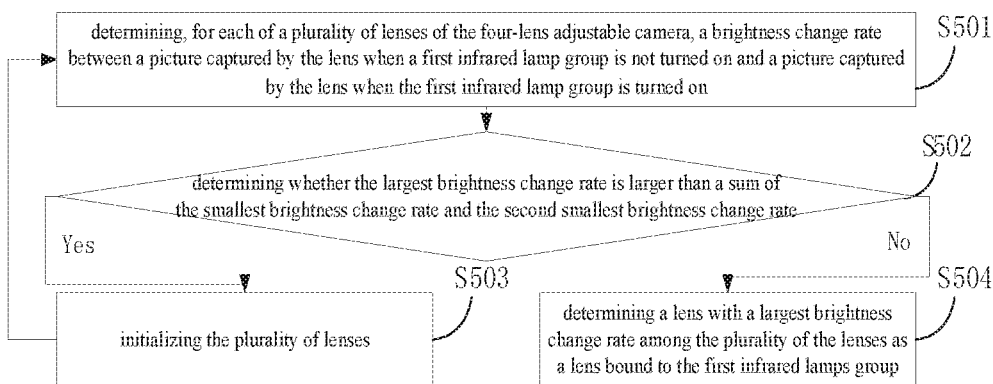
FIG. 5 is another flowchart of a method for controlling an infrared lamp that is applied to a four-lens adjustable camera according to an embodiment of the present application.

FIG. 5 is another flowchart of a method for determining a brightness change rate according to an embodiment of the present application. The method may include the following steps.

S501, determining, for each of a plurality of lenses of a four-lens adjustable camera, a brightness change rate between a picture captured by the lens when a first infrared lamp group is not turned on and a picture captured by the lens when the first infrared lamp group is turned on.

The step is the same with S101. A reference may be made to the description regarding S101, which will not be repeated here.

S502, determining whether a largest brightness change rate of the brightness change rates of the plurality of lenses is larger than a sum of a smallest brightness change rate and a second smallest brightness change rate of the brightness change rates; if the largest brightness change rate is larger than the sum of the smallest brightness change rate and the second smallest brightness change rate, performing S503; if the largest brightness change rate is not larger than the sum of the smallest brightness change rate and a second smallest brightness change rate, performing S504.

It is assumed that in S505, a calculated brightness change rate of a first lens is $Z_1$, a calculated brightness change rate of a second lens is $Z_2$, a calculated brightness change rate of a third lens is $Z_3$, a calculated brightness change rate of a fourth lens is $Z_4$, and the descending order of the four brightness change rates is $Z_1 > Z_2 > Z_3 > Z_4$. At this time, the largest brightness change rate is $Z_1$, the smallest brightness change rate is $Z_4$, and the second smallest brightness change rate is $Z_3$. It is determined whether $Z_1$ is larger than the sum of $Z_3$ and $Z_4$.

S503, initializing the plurality of lenses, and returning to S501.

Specifically, a reference may be made to the description regarding initializing the plurality of lenses in S305, which will not be repeated here.

S504, determining a lens with a largest brightness change rate among the plurality of lenses as a lens bound to the first infrared lamp group.

The step is the same with S102. A reference may be made to the description regarding S102, which will not be repeated here.

It can be understood that distances between the plurality of lenses in the four-lens adjustable camera are limited, and thus a difference of light compensations on the plurality of lenses by the infrared lamp group is not large. When the largest brightness change rate is larger than the sum of the smallest brightness change rate and the second smallest brightness change rate, it is indicated that the effect of light compensation on each lens by the first infrared lamp group this time is abnormal, for example, there is a lens with too large gain among the plurality of lenses. Therefore, the brightness change rates of the plurality of lenses obtained this time are not accurate enough. If a lens bond to the first infrared lamp group is determined according to the brightness change rates of the plurality of lenses obtained this time, the brightness compensation effect of the first infrared lamp group may not be maximized By this embodiment, it is possible to effectively low the occurrence possibility of this problem.

Figure 6:
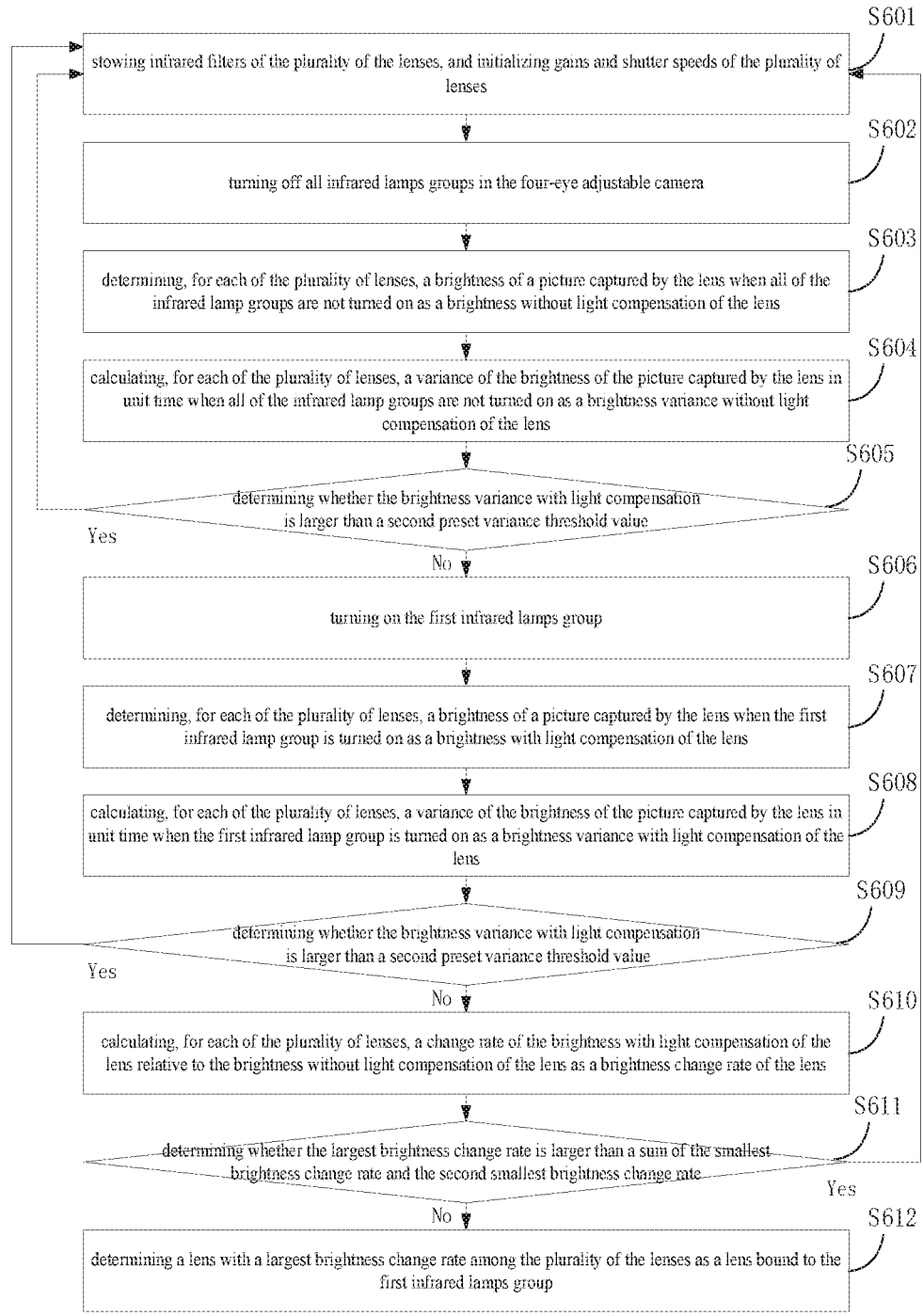
FIG. 6 is another flowchart of a method for controlling an infrared lamp that is applied to a four-lens adjustable camera according to an embodiment of the present application.

In an optional embodiment, as shown in FIG. 6, the method may include the following steps.

S601, stowing infrared filters of the plurality of lenses, and initializing gains and shutter speeds of the plurality of lenses.

Specifically, a reference may be made to the description regarding initializing the plurality of lenses in S307, which will not be repeated here. For the plurality of lenses in the four-lens adjustable camera, due to different monitoring scenes monitored by these lenses, infrared filters of a part of lenses may have been stowed and infrared filters of the other part of lenses may have not been stowed before this step, and the gains and shutter speeds of the lenses may also be different. This may result in that the effect of light compensations on the plurality of lenses by the first infrared lamp group may not be determined accurately. Thus, in this step, the infrared filters of the plurality of lenses are stowed, and the gains and the shutter speeds of the plurality of lenses are initialized.

S602, turning off all infrared lamp groups in the four-lens adjustable camera.

The step is the same with S201. A reference may be made to the description on S201, which will not be repeated here.

S603, determining, for each of the plurality of lenses, a brightness of a picture captured by the lens when all infrared lamp groups are not turned on as a brightness without light compensation of the lens.

Specifically, a reference may be made to the description regarding determining an average brightness in S202, which will not be repeated here.

S604, calculating, for each of the plurality of lenses, a variance of brightness of a picture captured by the lens in unit time when all the infrared lamp groups are not turned on as a brightness variance without light compensation of the lens.

The unit time represents the same time length with the unit time in S603. For example, both of the unit time in S603 and the unit time in S604 may be 1 second. In the embodiment, the brightness variance without light compensation of the plurality of lenses is calculated based on video frames that are used for determining the brightness without light compensation in S603. For example, in S603, the brightness without light compensation of the first lens in the four-lens adjustable camera is determined by 60 video frames that are captured by the first lens within 1s when all infrared lamp groups are not turned on, and accordingly, in this step, the brightness variance without light compensation of the first lens is also calculated based on the 60 video frames. It can be understood that an average brightness of the 60 video frames is required to be obtained when the variance of brightness of the 60 video frames is calculated. Because the average brightness of the 60 video frames is already determined in S603, thus the average brightness of the 60 video frames is no longer needed to be calculated, which saves a certain amount of calculation.

S605, determining whether the brightness variance without light compensation is larger than a first preset variance threshold; if the brightness variance without light compensation is larger than the first preset variance threshold, returning to S601; if the brightness variance without light compensation is not larger than the first preset variance threshold, performing S606.

The step is the same with S304. A reference may be made to the description regarding S304, which will not be repeated here.

S606, turning on the first infrared lamp group.

The step is the same with S203. A reference may be made to the description regarding S203, which will not be repeated here.

S607, determining, for each of the plurality of lenses, a brightness of a picture captured by the lens when the first infrared lamp group is turned on as a brightness with light compensation of the lens.

The step is the same with S204. A reference may be made to the description regarding S204, which will not be repeated here.

S608, calculating, for each of the plurality of lenses, a variance of brightness of a picture captured by the lens in unit time when the first infrared lamp group is turned on, as a brightness variance with light compensation of the lens.

S609, determining whether the brightness variance with light compensation is larger than a second preset variance threshold; if the brightness variance with light compensation is larger than the second preset variance threshold, returning to S601; if the brightness variance with light compensation is not larger than the second preset variance threshold, performing S610.

The step is the same with S406. A reference may be made to the description regarding S406, which will not be repeated here.

S610, calculating, for each of the plurality of lenses, a change rate of the brightness with light compensation of the lens relative to the brightness without light compensation of the lens as a brightness change rate of the lens.

The step is the same with S308. A reference may be made to the description regarding S308, which will not be repeated here.

S611, determining whether a largest brightness change rate of the brightness change rates of the plurality of lenses is larger than a sum of a smallest brightness change rate and a second smallest brightness change rate of the brightness change rates; if the largest brightness change rate is larger than the sum of the smallest brightness change rate and the second smallest brightness change rate, returning to S601; if the largest brightness change rate is not larger than the sum of the smallest brightness change rate and the second smallest brightness change rate, performing S612.

S612, determining a lens with the largest brightness change rate among the plurality of lenses as a lens bound to the first infrared lamp group.

The step is the same with S102. A reference may be made to the description on S102, which will not be repeated here.

This embodiment can re-determine the effect of light compensations on the plurality of lenses by the first infrared lamp group when the brightness of the picture captured by the lens is determined to be abnormal, improving the accuracy of the effect of light compensations on the plurality of lenses by the first infrared lamp group.

Figure 7:
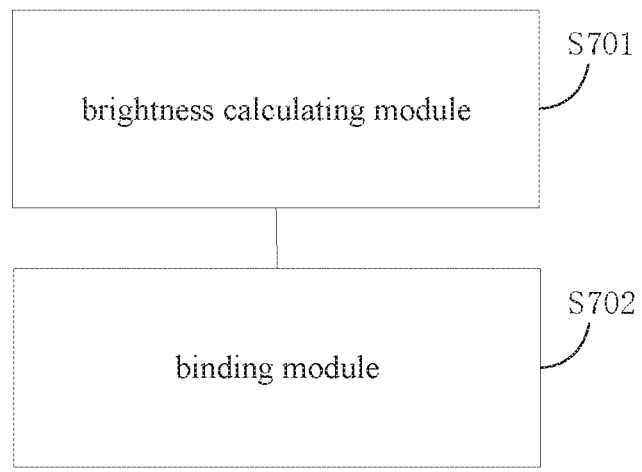
FIG. 7 is a structural diagram of an apparatus for controlling an infrared lamp that is applied to a four-lens adjustable camera according to an embodiment of the present application.

FIG. 7 is a structural diagram of an apparatus for controlling an infrared lamp according to an embodiment of the present application. The apparatus may include:

a brightness calculating module 701 configured for determining, for each of a plurality of lenses in a four-lens adjustable camera, a brightness change rate between a picture captured by the lens when a first infrared lamp group is not turned on and a picture captured by the lens when the first infrared lamp group is turned on, the first infrared lamp group being one infrared lamp group in the four-lens adjustable camera; and a binding module 702 configured for determining a lens with a largest brightness change rate among the plurality of lenses as a lens bound to the first infrared lamp group.

Further, the brightness calculating module 701 is specifically configured for:

turning off all infrared lamp groups in the four-lens adjustable camera;

determining, for each of the plurality of lenses, a brightness of a picture captured by the lens when all of the infrared lamp groups are not turned on as a brightness without light compensation of the lens;

turning on the first infrared lamp group;

determining, for each of the plurality of lenses, a brightness of a picture captured by the lens when the first infrared lamp group is turned on as a brightness with light compensation of the lens; and calculating, for each of the plurality of lenses, a change rate of the brightness with light compensation of the lens relative to the brightness without light compensation of the lens as a brightness change rate of the lens.

Further, the brightness calculating module 701 is further configured for: after determining, for each of the plurality of lenses, the brightness of the picture captured by the lens when all of the infrared lamp groups are not turned on as the brightness without light compensation of the lens, calculating, for each of the plurality of lenses, a variance of the brightness of the picture captured by the lens in unit time when all of the infrared lamp groups are not turned on as a brightness variance without light compensation of the lens;

initializing the plurality of lenses and performing the turning off all infrared lamp groups in the four-lens adjustable camera if a lens whose brightness variance without light compensation is larger than a first preset variance threshold exists among the plurality of lenses; and continuing to perform the turning on the first infrared lamp group if no lens whose brightness variance without light compensation is larger than the first preset variance threshold exists among the plurality of lenses.

Further, the brightness calculating module 701 is further configured for: after determining, for each of the plurality of lenses, the brightness of the picture captured by the lens when the first infrared lamp group is turned on as the brightness with light compensation of the lens, calculating a variance of the brightness of pictures captured by the plurality of lenses in unit time when the first infrared lamp group is turned on as a brightness variance with light compensation;

calculating, for each of the plurality of lenses, a variance of the brightness of the picture captured by the lens in unit time when the first infrared lamp group is turned on as a brightness variance with light compensation of the lens;

initializing the plurality of lenses and performing the turning off all infrared lamp groups in the four-lens adjustable camera if a lens whose brightness variance with light compensation is larger than a second preset variance threshold exists among the plurality of lenses; and continuing to perform the calculating, for each of the plurality of lenses, a change rate of the brightness with light compensation of the lens relative to the brightness without light compensation of the lens as a brightness change rate of the lens, if no lens whose brightness variance with light compensation is larger than the second preset variance threshold exists among the plurality of lenses.

Further, the brightness calculating module 701 is further configured for: after determining, for each of the plurality of lenses of the four-lens adjustable camera, the brightness change rate between the picture captured by the lens when the first infrared lamp group is not turned on and the picture captured by the lens when the first infrared lamp group is turned on, determining whether a largest brightness change rate of the brightness change rates of the plurality of lenses is larger than a sum of a smallest brightness change rate and a second smallest brightness change rate of the brightness change rates;

if the largest brightness change rate is larger than the sum of the smallest brightness change rate and the second smallest brightness change rate, initializing the plurality of lenses and performing the determining, for each of a plurality of lenses of the four-lens adjustable camera, a brightness change rate between a picture captured by the lens when a first infrared lamp group is not turned on and a picture captured by the lens when the first infrared lamp group is turned on; and if the largest brightness change rate is not larger than the sum of the smallest brightness change rate and the second smallest brightness change rate, continuing to perform the determining a lens with a largest brightness change rate among the plurality of lenses as a lens bound to the first infrared lamp group.

Further, the brightness calculating module 701 is specifically configured for:

stowing infrared filters of the plurality of lenses; and
initializing gains and shutter speeds of the plurality of lenses.

Further, the brightness calculating module 701 is specifically configured for:

determining, for each of the plurality of lenses, an average brightness of all bayer image frames captured by the lens in unit time when all of the infrared lamp groups are not turned on as the brightness without light compensation of the lens; and determining, for each of the plurality of lenses, an average brightness of all bayer image frames captured by the lens in unit time when the first infrared lamp group is turned on as the brightness with light compensation of the lens.

Figure 8:
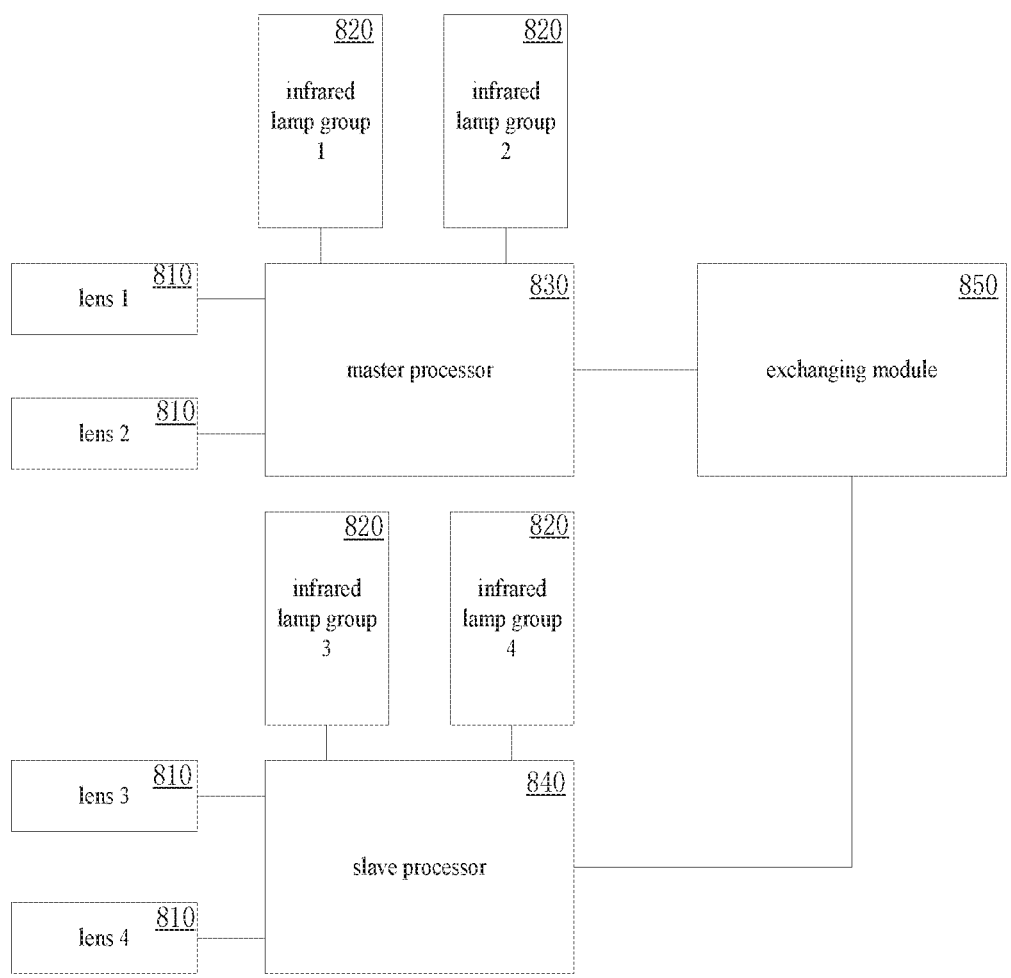
FIG. 8 is a structural diagram of a four-lens adjustable camera according to an embodiment of the present application.

FIG. 8 is a structural diagram of the four-lens adjustable camera according to an embodiment of the present application. The camera may include:

four lenses 810, four infrared lamp groups 820, a master processor 830, a slave processor 840, and an exchanging module 850.

The four lenses 810 are movably mounted to the four-lens adjustable camera. For example, in an optional embodiment, the four-lens adjustable camera may include a top plate and a track plate secured to the top plate by a plurality of fasteners. Four lens holders are movably provided on the track plate. Each lens holder is provided with one lens 810. The four lens holders are movable on the track plate and are rotatable on a plane where the track plate is located. The scheme can refer to US20170299949A1.

In another optional embodiment, the four-lens adjustable camera may be provided with a mounting rail. The four lenses 810 are respectively disposed on the four lens holders. The four lens holders are disposed on the mounting rail, and each of the four lens holders includes a lock device. The lens holder is secured to the mounting rail when the lock device is in a locking state. The lens holder is movable on the mounting rail when the lock device is in a releasing state. One of the lock device and the mounting rail includes a magnet, and the other includes ferromagnetic material. For example, the lock device includes the ferromagnetic material and the mounting rail includes the magnet. The lens holder can be fixed to the mounting rail depending on an attraction between the magnet and the ferromagnetic material. The scheme can refer to US20170031234A1.

Two lenses 810 of the four lenses 810 are electrically connected to the master processor 830, and the other two lenses 810 are electrically connected to the slave processor 840. Two infrared lamp groups 820 of the four infrared lamp groups 820 are electrically connected to the master processor 830, and the other two infrared lamp groups 820 are electrically connected to the slave processor 840. In the embodiment, the master processor 830 and the slave processor 840 may each have two Pulse Width Modulation (PWM) interfaces. The master processor 830 are electrically connected to the two infrared lamp groups 820 via the two PWM interfaces thereof and the slave processor 840 are electrically connected to the other infrared lamp groups 820 via the two PWM interfaces thereof. A PMW interface may transfer a PWM signal with a specific duty cycle to the infrared lamp group 820 connected to the PMW interface. When the duty cycle of the PWM signal is 0, i.e., the whole signal is at a low level, the infrared lamp group 820 connected to the PWM interface is in a turned-off state. When the duty cycle of the PWM signal is not 0, the infrared lamp group 820 connected to the PWM interface is in a turn-on state. Furthermore, the brightness is depending on the duty cycle of the PWM signal, when the duty cycle of the PWM signal is 1, i.e., when the whole signal is at a high level, the infrared lamp group 820 connected to the PWM interface reaches its largest brightness.

The exchanging module 850 is electrically connected to the master processor 830 and the slave processor 840 and is configured to exchange between the master processor and the slave processor, wherein, the exchanging module 850 may be a network switch chip, or a bus.

The master processor 830 is configured to control the two lenses 810 and the two infrared lamp groups 820 that are electrically connected to the master processor 830 and send a control instruction to the slave processor 840. The slave processor 840 is configured to control the two lenses 810 and the two infrared lamp groups 820 that are electrically connected to the slave processor 840 according to the control instruction. The control instruction is sent by the master processor 830 to the slave processor 840 via the exchanging module. The master processor 830 indirectly controls the two lenses 810 and the two infrared lamp groups 820 that are electrically connected to the slave processor 840 through the control instruction.

The master processor 830 is further configured to control the four-lens adjustable camera to perform the following steps:

determining, for each lens 810, a brightness of a picture captured by a lens 810 when the four infrared lamp groups 820 are not turned on as a brightness without light compensation of the lens 810, wherein the brightness without light compensation of the lens 810 may be a brightness of an image frame captured by the lens 810 at a moment; optically, may be an average brightness of all bayer image frames captured by the lens 810 in unit time;

determining, for each lens 810, a brightness of a picture captured by a lens 810 when only one infrared lamp group (which is referred as a first infrared lamp group) of the four infrared lamp groups 820 is turned on as a brightness with light compensation of the lens 810, wherein the brightness with light compensation of the lens 810 may be a brightness of an image frame captured by the lens 810 at a moment; optically, may be an average brightness of all bayer image frames captured by the lens 810 in unit time;

calculating, for each lens 810, a change rate of the brightness with light compensation relative to the brightness without light compensation as a brightness change rate of the lens 810; and determining a lens with a largest brightness change rate among the four lenses 810 as a lens bound to the first infrared lamp group.

In an optional embodiment, the four-lens adjustable camera may include: four lenses, four infrared lamp groups, and a control apparatus.

The four lenses are movably mounted into the four-lens adjustable camera. A manner for mounting the lenses in the four-lens adjustable camera may refer to any one of three manners in the embodiments for the four-lens adjustable camera.

The four infrared lamp groups are configured to perform light compensation on the four lenses.

The control apparatus includes at least one processor for: controlling the four-lens adjustable camera to perform any one of the above methods; determining whether the plurality of infrared lamp groups 820 needs to be turned on according to working modes of the plurality of lenses 810 and a binding relationship between the plurality of lenses 810 and the infrared lamp groups 820, to obtain a determination result for the plurality of infrared lamp groups 820; and controlling the turn-on and turn-off of the plurality of infrared lamp groups according to the determination result.

The control apparatus 830 may only include one processor. The processor is electrically connected to each lens 810 in the four-lens adjustable camera and each infrared lamp group 820 in the four-lens adjustable camera. The control apparatus 830 may also include a plurality of processors. Each processor is electrically connected to a part of the lenses 810 in the four-lens adjustable camera and to a part of the infrared lamp groups 820 in the four-lens adjustable camera. Each lens 810 is only electrically connected to one processor and each infrared lamp group 820 is only electrically connected to one processor. The number of the processors included in the control apparatus 830 may be determined by the number of interfaces of each processor and the number of lenses 810 and infrared lamp groups 820 included in the four-lens adjustable camera. The structure of the four-lens adjustable camera according to the embodiment of the present application and the manner for mounting lenses to the four-lens adjustable camera will be described below.

Figure 9:
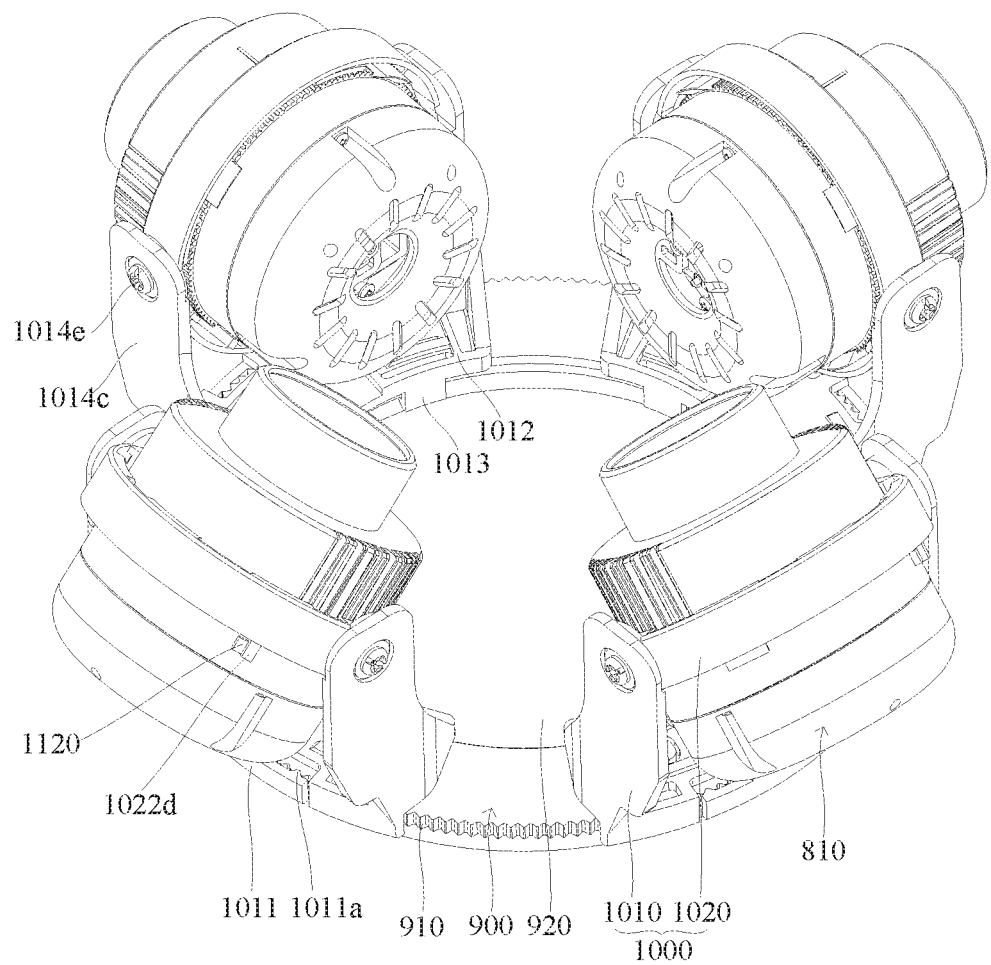
FIG. 9 is a structural diagram of a lens adjusting means provided with lenses in a four-lens adjustable camera according to an embodiment of the present application.
Figure 10:
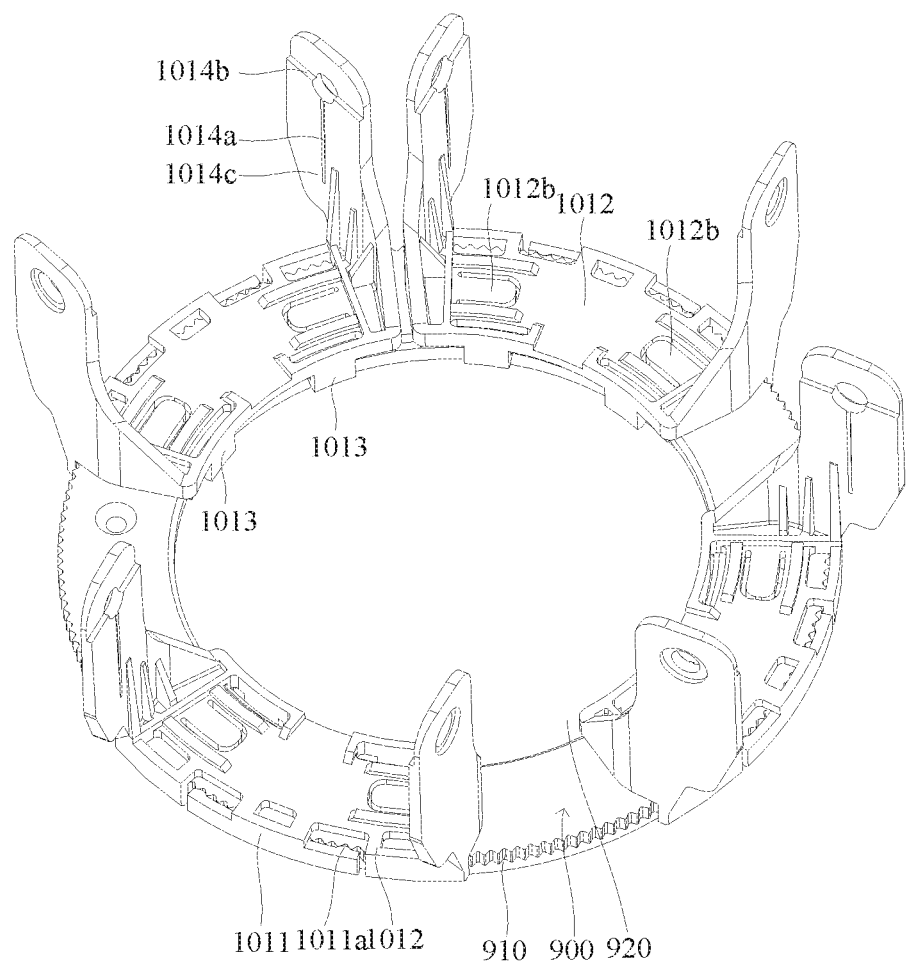
FIG. 10 is a partial structural diagram of a lens adjusting means in a four-lens adjustable camera according to an embodiment of the present application.
Figure 11:
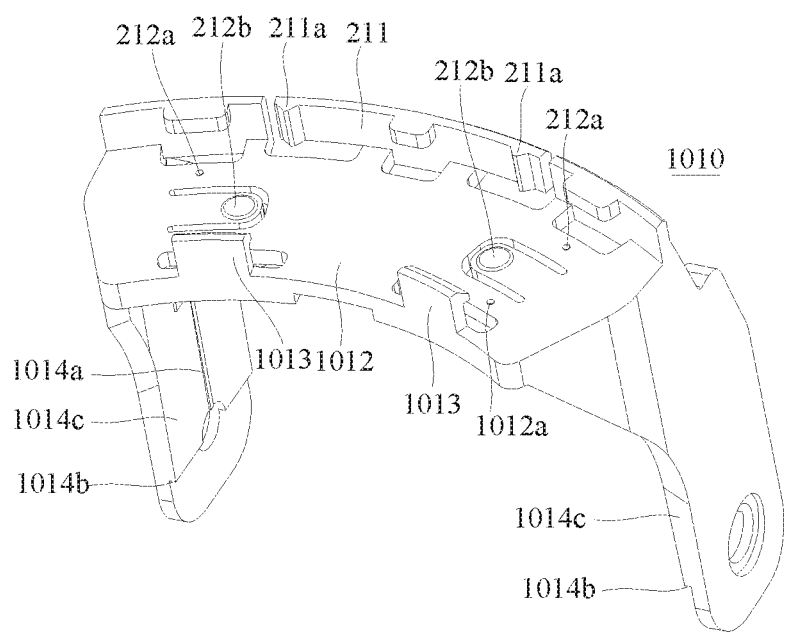
FIG. 11 is a structural diagram of a first holder in the four-lens adjustable camera according to an embodiment of the present application.

In an optional embodiment, referring to FIG. 9 to FIG. 11, a lens adjustment device that is applicable to the four-lens adjustable camera is disclosed. The disclosed lens adjustment device includes a fixed disk 900 and at least two lens holders 1000. The fixed disk 900 is included in a body of the four-lens adjustable camera. The fixed disk 900 is a mounting base for a lens holder 1100 and the lens 810. The lens 810 is disposed on the fixed disk 900 via the lens holder 1100.

The lens holder 1000 includes a first holder 1010 for mounting the lens 810. The first holder 1010 is movably disposed on the fixed disk 900, and thus movable relative to the fixed disk 900. The lens 810 will move with the motion of the first holder 1010, and thus a position of the lens 810 on the fixed disk 900 can be adjusted.

One of the first holder 1010 and the fixed disk 900 is provided with a first tooth slot and the other is provided with a first engaging tooth. The first tooth slot engages with the first engaging tooth. The first holder 1010 connects with the fixed disk 900 through the engaging of the first tooth slot and the first engaging tooth.

In the disclosed lens adjustment device according to an embodiment of the present application, the lens 810 is mounted on the first holder 1010, and thus is movable on the fixed disk 900 with the first holder 1010, so that the position of the lens 810 on the fixed disk 900 is adjusted. The first holder 1010 connects with the fixed disk 900 through the engaging of the first tooth slot and the first engaging tooth. In the adjustment process, an operator can actuate the first holder 1010 to move by applying a certain force. In the movement process of the first holder 1010, the first tooth slot moves relative to the first engaging tooth. After the adjustment (the external force disappears) ends, the engaging of the first tooth slot and the first engaging tooth can ensure that the first holder 1010 is positioned in the adjusted position. Accordingly, the adjustment of the lens is completed.

Compared with the method for fixing the lens through a magnet in the prior art, the lens adjustment device disclosed in the present application is not required to employ a magnet with a large volume. Thus, the lens adjustment device disclosed in the present application can solve the problem that heavy mass and high cost of the existing four-lens adjustable camera in which the lens is locked through the magnet.

In a specific implementation, a circle edge of the fixed disk 900 partially or fully is provided with the first tooth slot 910, and accordingly, the first holder 1010 is provided with the first engaging tooth 1011a. The first holder 1010 is movable in a circumferential direction of the fixed disk 900, and thus rotatable in the circumferential direction of the fixed disk 900. The lens 810 will rotate with the rotation of the first holder 1010, and thus the position of the lens 810 on the fixed disk 900 can be adjusted. The position is adjusted in a disk surface parallel to the fixed disk 900, which is called P direction adjustment of the lens 810. Of course, the first tooth slot 910 may be disposed on the first holder 1010, and accordingly, the first engaging tooth 1011a is provided on the fixed disk 900.

The first holder 1010 may include an elastic connection portion 1011. The elastic connection portion 1011 may be provided with a first engaging tooth 1011a. The first engaging tooth 1011a engages with the first tooth 910. It should be noted that in the present application, the engaging of the first tooth slot and the first engaging tooth means that both of them are in a fixed state without external force. In this state, the first tooth slot and the second engaging tooth can't move relative to each other. When the first tooth slot or the first engaging tooth is elastically deformed by external force, a fixed engagement between both of them is released, so that the first tooth slot and the second engaging tooth can move relative to each other, and thus the first holder 1010 can move in the circumferential direction of the fixed disk 900, that is, the first holder 1010 rotate in the circumferential direction of the fixed disk 900.

The elastic connection portion 1011 ensures that the engaging between the first tooth slot 910 and the first engaging tooth 1011a has a good elasticity via the elasticity thereof. The elastic connection portion 1011 will be elastically deformed by the external force, so that the engagement between the first engaging tooth 1011a and the first tooth slot 910 is released, and thus both of them can rotate relative to each other.

There are multiple methods to implement that the first holder 1010 rotates in the circumferential direction of the fixed disk 900. The first holder 1010 may roll in the circumferential direction of the fixed disk 900, and thus rotates in the circumferential direction of the fixed disk 900. The first holder 1010 may further slide in the circumferential direction of the fixed disk 900, and thus rotates in the circumferential direction of the fixed disk 900.

In a specific implementation, the fixed disk 900 may be provided with a circular slide rail. The first holder 1010 is fixedly connected with the circular slide rail in a direction perpendicular to the disk surface of the fixed disk 900, and the first holder 1010 slides relative to the fixed disk 900 in the circumferential direction of the fixed disk 900. The fixed connecting of the first holder 1010 with the circular slide rail means that the first holder 1010 can't move relative to the fixed disk 900 in the direction perpendicular to the disk surface, and can only move in the circumferential direction of the fixed disk 900. Thus, the rotation of the first holder is achieved. Herein, the fixed connecting of the first holder 1010 with the circular slide rail in the direction perpendicular to the disk surface of the fixed disk 900 causes that the first holder 1010 cannot move relative to the fixed disk 900 in the direction perpendicular to the disk surface of the fixed disk 900.

A plurality of methods may be used for providing the circular slide rail on the fixed disk 900. For example, the circular slide rail is provided on the disk surface of the fixed disk 900. Returning to FIG. 9, an escape hole 920 is provided in the center of the fixed disk 900. Specifically, the escape hole 920 can pass through the fixed disk 900. The escape hole 920 is provided to make the whole fixed disk 900 as a circular member. The first holder 1010 moves along the circular member to implement the rotation of the first holder 1010 in the circumferential direction of the fixed disk 900.

Referring to FIGS. 9 to 11, the first holder 1010 may include a connection base 1012 and a first snap 1013. The connection base 1012 is attached on one side of the fixed disk 900. The first snap 1013 fixedly connects with the connection base 1012 and engages with the fixed disk 900 through the escape hole 920. The connection base 1012 and the first snap 1013 are respectively connected with both sides of the fixed disk 900, which can assemble the first holder 1010 on the fixed disk 900. In the process of the first holder 1010 rotating in the circumferential direction of the fixed disk 900, the connection base 1012 can slide relative to one side of the fixed disk 900, and the first snap 1013 can slide relative to the other side of the fixed disk 900.

The elastic connection portion 1011 may be a part of the connection base 1012 or the first snap 1013, or may be independent of the connection base 1012 and the first snap 1013.

In a specific implementation, the first holder 1010 may include the connection base 1012 and the elastic connection portion 1011. The elastic connection portion 1011 is a first elastic arm. One end of the first elastic arm is fixed on the connection base 1012, and the other end is a free end, which may be located outside of the circle edge of the fixed disk 900. The free end of the first elastic arm is elastically deformed relative to the connection base 1012, and thus the connection is released to rotate the first holder 1010 relative to the fixed disk 900.

In order to ensure that the first holder 1010 doesn't rotate without external force or with small interference, in an optional scheme, at least one of the first holder 100 and the fixed disk 900 is provided with a tension portion that can be contact with the other in tension. Referring to FIG. 11, the tension portion may include a first tension projection 1012a and/or a second elastic arm 1012b. In an optional scheme, the first holder 1010 includes a connection base 1012, which is contact with the disk surface of the fixed disk 900. The connection base 1012 has a bottom surface that is contact with the fixed disk 900. The bottom surface may be provided with a first tension projection 1012a and a second elastic arm 1012b. The first holder 1010 is contact with the fixed disk 900 in tension by the first tension projection 1012a and the second elastic arm 1012b.

Referring to FIG. 10 again, in an embodiment, there may be a plurality of lens holders 1000. The plurality of lens holders 1000 may be distributed along the circumferential direction of the fixed disk 900. Specifically, the plurality of lens holders 1000 may be distributively arranged along the circumferential direction of the fixed disk 900.

Referring to FIGS. 9, 12, 13 and 14, in the lens adjustment device disclosed in the embodiment of the present application, the lens holder 1000 includes a second holder 1020, which is provided on the first holder 1010. The second holder 1020 is rotatably connected with the lens 810 to enable the lens to rotate around its axis, so as to achieve the purpose of adjusting the lens 810, that is, to realize the adjustment of the lens 810 in R direction.

The second holder 1020 is rotatably provided on the first holder 1010 and is movable in a direction perpendicular to the disk surface of the fixed disk 900. Thus, the pitching rotation of the lens 810 is performed by the second holder 1020, and eventually the rotation adjustment of the lens 810 in the direction perpendicular to the disk surface of the fixed disk 900, that is an adjustment in T direction, is performed.

In order to implement a more flexible adjustment, the first holder 1010 may include a support arm 1014 rotatably connected with the second holder 1020. The second holder 1020 includes a tension disk 1021 that is movably connected with the support arm 1014. The tension disk 1021 includes a tension zone. One of the tension zone and the support arm 1014 is provided with a second tension projection and the other is provided with a plurality of tension slots 1021*a* that extend radially along the tension disk 1021. The tension slots 1021*a* engage with the second tension projection. In a specific implementation, the tension slots 1021*a* are provided on the tension disk 1021, and the second tension projection 1014*a* is provided on the support arm 1014. The second tension projection 1014*a* and the tension slots 1021*a* can relatively move with the rotation of the second holder 1020. It should be noted that the engagement of the tension slot 1021*a* with the second tension projection means that the second tension projection 1014*a* and the tension slot 1021*a* are positioned when the second holder 1020 is not subject to external force, in order to ensure that the lens 810 is maintained in a certain position. When the second holder 1020 is subject to external force, the engagement of the second tension projection 1014*a* and the tension slot 1021*a* is released due to an elastic deformation, so that they can move relative to each other.

In an actual application, the lens 810 is only required to rotate relative to the second holder 1020 within a set angle range. In view of this, referring to FIG. 10 and FIG. 12, the support arm 1014 may be provided with a first restriction portion 1014*b* and the tension disk 1021 is provided with a second restriction portion 1021*b*. The second restriction portion 1021*b* can be restriction-connected with the first restriction portion 1014*b* in the rotation direction of the tension disk 1021.

Figure 12:
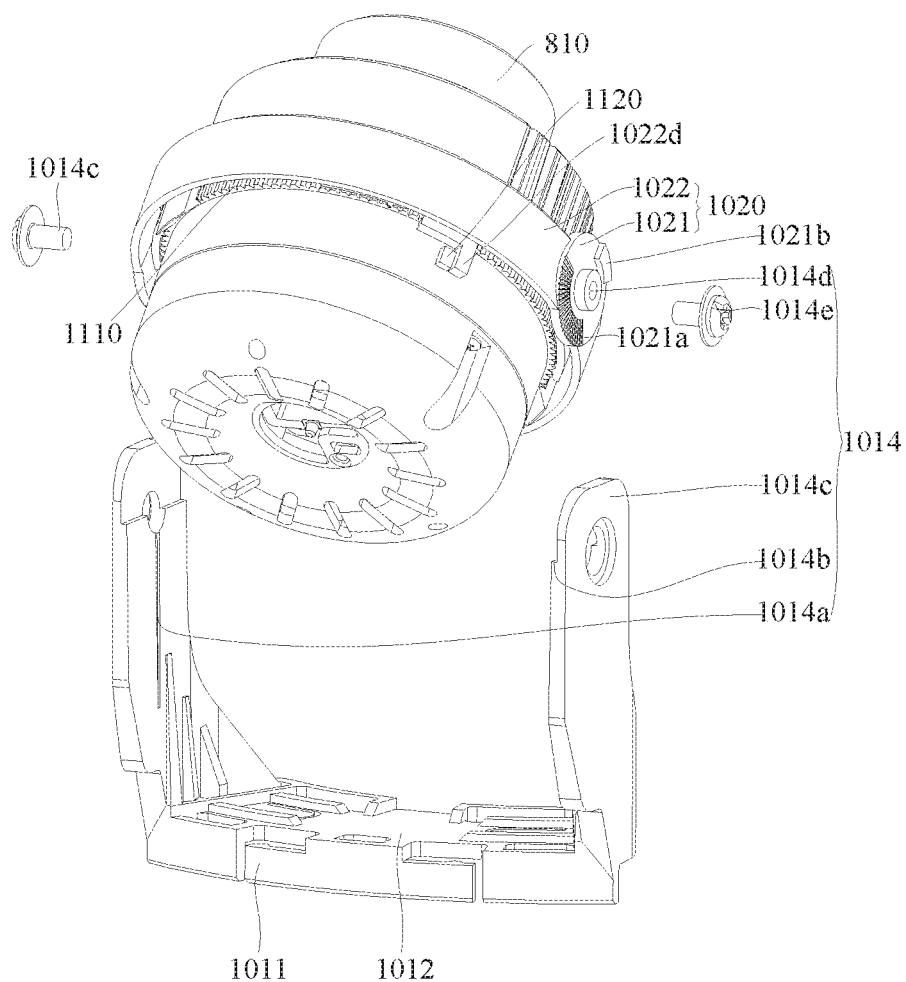
FIG. 12 is a partial exploded structural diagram of a lens holder and a lens in the four-lens adjustable camera according to an embodiment of the present application.
Figure 13:
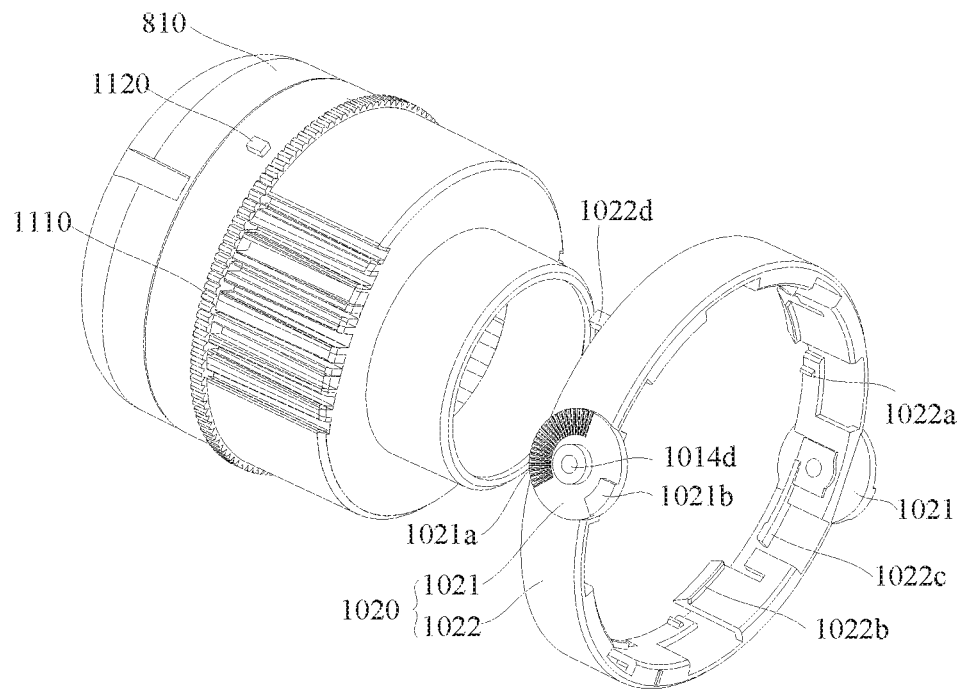
FIG. 13 is a partial exploded structural diagram of a second holder and a lens in the four-lens adjustable camera according to an embodiment of the present application.
Figure 14:
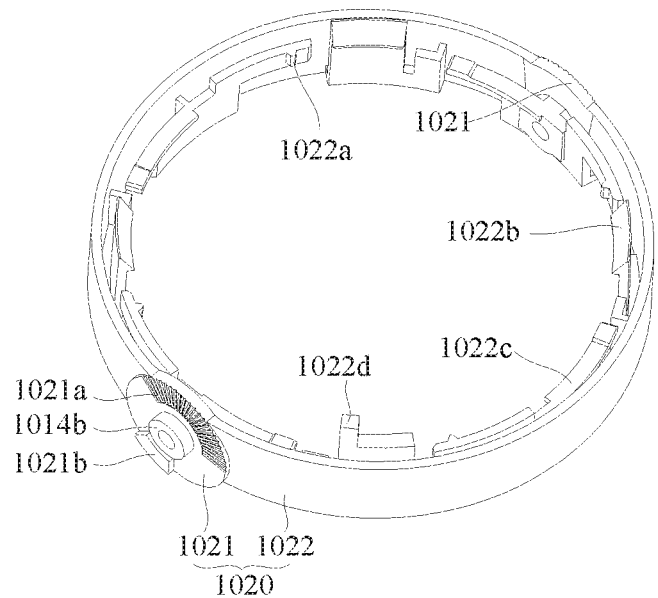
FIG. 14 is a partial structural diagram of the second holder in the four-lens adjustable camera according to an embodiment of the present application.

Referring to FIG. 12, in a specific implementation, the support arm 1014 may include a support arm body 1014*c* and a fixed block 1014*d* fixed on the support arm body 1014*c*. The fixed block 1014*d* is movably connected with the tension disk 1021, and thus rotates relative to the tension disk. The fixed block 1014*d* and the tension disk 1021 may be fixed on the support arm body 1014*c* via a screw 1014*e*. The scheme implements the rotation of lens 810 relative to the support arm 1014 through a rotatable connection between the fixed block 24441014*d* and the tension disk 1021.

In order to improve the stability of the rotation of the lens 810, in an optional scheme, there may be two support arms 1014. The two support arms 1014 are respectively arranged at two sides of the second holder 1020.

Referring to FIGS. 9, 12, 13 and 14 again, the second holder 1020 may include a circular member 1022. The circular member 1022 is movably connected with the lens 810, so as to enable the lens 810 to rotate around its axis. The tension disk 1021 may be provided on the circular member 1022.

One of the circular member 1022 and lens 810 is provided with a second tooth slot and the other is provided with a second engaging tooth that engages with the second tooth, the second engaging tooth rotates relative to the second tooth slot in the circumferential direction of the lens 810. Specifically, the second tooth slot 1110 may be provided on the lens 810, and accordingly, the second engaging tooth 1022*a* may be provided on the circular member 1022.

A second snap 1022*b* and a protuberance 1022*c* may be disposed on an inner wall of the circular member 1022. The protuberance 1022*c* is fixedly connected with one end of the second engaging tooth 1022*a* or the second tooth slot 1110 on the lens 810 in a set direction, so that the circular member 1022 can't move relative to the lens 810 in the set direction. The second snap 1022*b* engages with the other end of the second engaging tooth 1022*a* or the second tooth slot 1110 on the lens 810, so as to position the lens 810 and the circular member 1022 in an axial direction of the circular member 1022. It should be noted that the set direction is an axis direction of the lens 810.

Specifically, the protuberance 1022*c* may be a third elastic arm perpendicular to the inner wall of the second holder 1020. The third elastic arm is tension-connected with one end of the second engaging tooth 1022*a* or the second tooth slot 1110.

In an actual application, the lens 810 usually rotates around its axis in a certain angle range, without rotating around its axis in the range of 360°. Based on this, referring to FIGS. 12-14 again, in an optional scheme, the circular member 1022 is provided with a third restriction portion 1022*d*, and the lens 810 is provided with a fourth restriction portion 1120. The third restriction portion 1022*d* is restriction-connected with the fourth restriction portion 1120 in the direction of lens 810 rotating around its axis for position restriction. The restriction connection of the third restriction portion 1022*d* with the fourth restriction portion 1120 enables the lens 810 to rotate in a required angle range.

Based on the lens adjustment device disclosed in the embodiment of the present application, the embodiment of the present application further discloses a four-lens adjustable camera. The disclosed four-lens adjustable camera includes the lens 810 and the lens adjustment device according to the embodiment.

Figure 15:
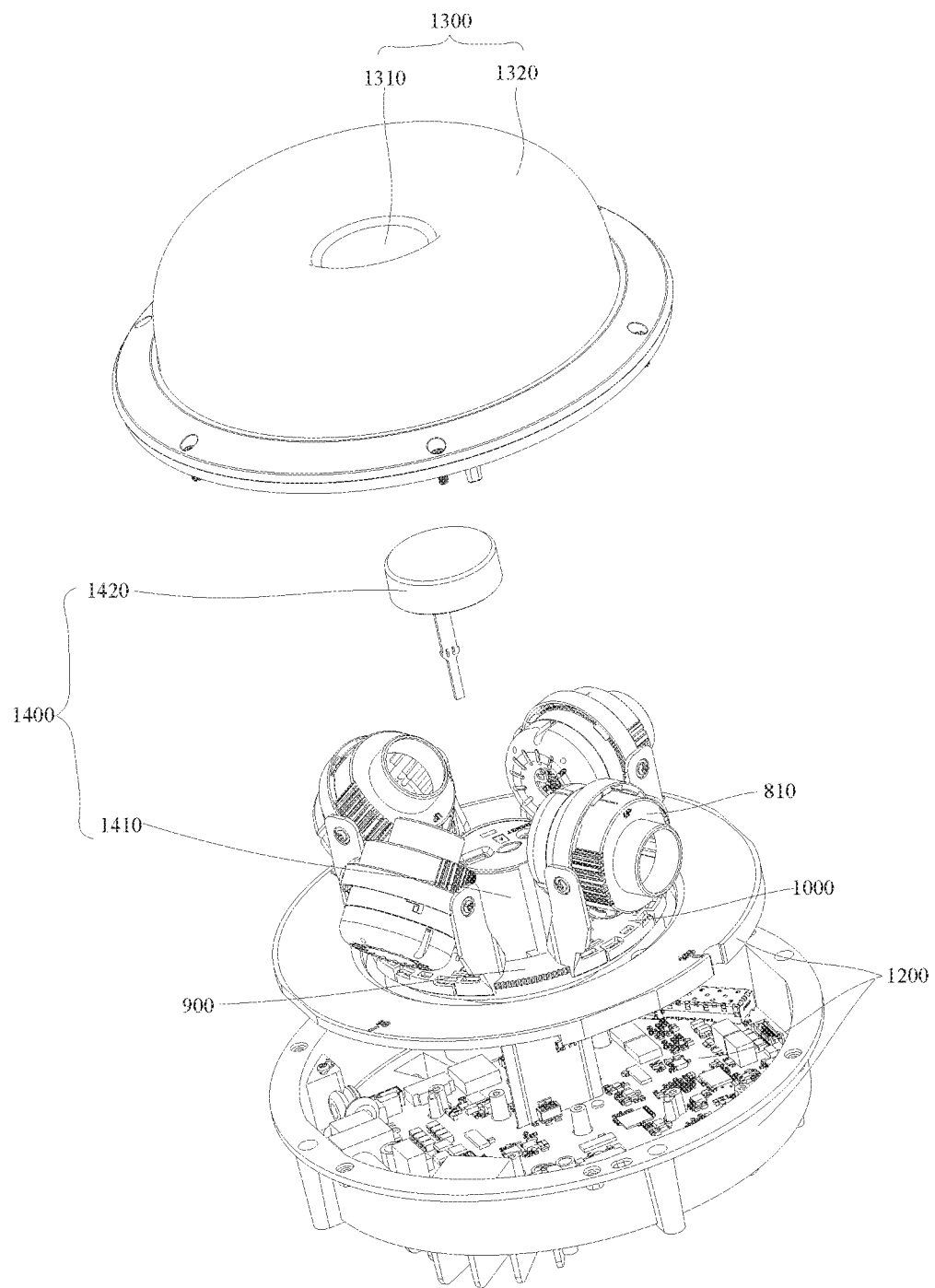
FIG. 15 is an exploded structural diagram of the four-lens adjustable camera according to an embodiment of the present application.
Figure 16:
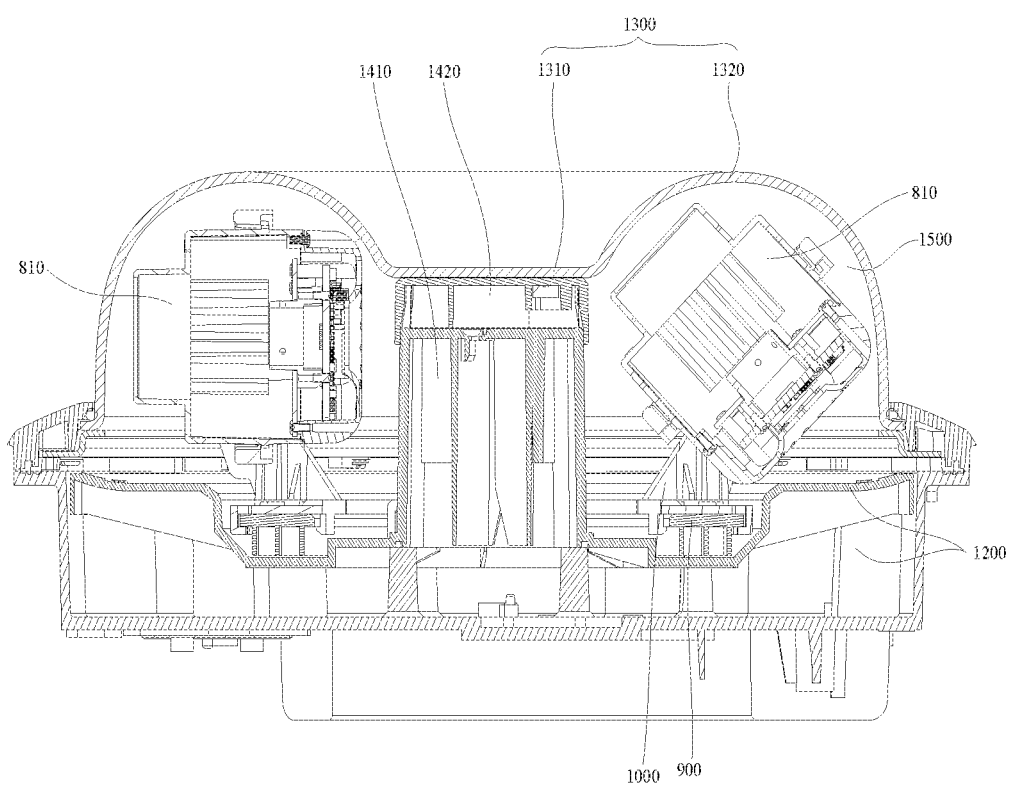
FIG. 16 is a cross-section view of the four-lens adjustable camera according to an embodiment of the present application.

Referring to FIG. 15 and FIG. 16, the four-lens adjustable camera disclosed in the embodiment of the present application includes a body housing assembly 1200 and a transparent cover 1300. The body housing assembly 1200 usually comprises a plurality of parts. The body housing assembly 1200 can provide a mounting base or receiving space for other parts of the four-lens adjustable camera.

The transparent cover 1300 and the lens adjustment device are mounted on the body housing assembly 1200. In general, the transparent cover 200 is fixed on the body housing assembly 900 in a fixed manner. The transparent cover 1300 includes a plane portion 1310 and a curved surface portion 1320 around the plane portion 1310. In a specific implementation, the plane portion 1310 may be located in the center of the transparent cover 1300, and the curved surface portion 1320 is distributed around the plane portion 1310.

The four-lens adjustable camera further includes a support mechanism 1400. One end of the support mechanism 1400 contacts with the body housing assembly 1200, and the other end contacts with the plane portion 1310. The support mechanism 1400, the curved surface portion 1320 and the body housing assembly 1200 constitute a lens receiving space 1500. The lens 810 is located inside the lens receiving space 1500.

In the four-lens adjustable camera disclosed in the embodiment of the present application, one end of the support mechanism 1400 contacts with the body housing assembly 900, and the other end contacts with the plane portion 520, supporting the transparent cover 1300. This structure will cause the less deformation of the transparent cover 1300 with external force, thereby improving the deformation resistance of the transparent cover 1300, and eventually improving the explosion-proof performance of the four-lens adjustable camera.

There are a variety of structures of the support mechanisms 1400. In a specific implementation, the support mechanism 1400 may include a support body 1410 and an elastic pad 1420. One end of the support body 1410 may be fixed on the body housing assembly 900, and the elastic pad 1420 is supported between the other end of the support body 1410 and the plane portion 1310.

The support body 1410 is a main support member. The support body 1410 is supported on the plane portion 1310 via the elastic pad 1420. The elastic pad can ensure an elastic contact between the support mechanism 1400 and the transparent cover 1300, thereby avoiding a rigid contact of the transparent cover 1300 with the support body 1410 when the transparent cover is subjected to impact, and further lowering the possibility of the breaking of the transparent cover 1300. As described above, the body housing assembly 1200 generally includes a plurality of parts. One end of the support body 1410 can be fixedly connected with at least one of the plurality of parts included in the body housing assembly 1200, so as to be fixedly connected with the body housing assembly 1200.

In another optional embodiment, referring to FIGS. 17-24, the lens adjustment device in the four-lens adjustable camera disclosed in the embodiment of the present application includes a third holder 1700 and a fourth holder 1800. The third holder 1700 is fixed on the body 2100 of the four-lens adjustable camera. Specifically, the third holder 1700 may be fixed on the body 2100 via a second screw 1750. The fourth holder 1800 is provided on the third holder 1700 and is configured for mounting the lens 810. The lens 810 operates through the operation of the fourth holder 1800.

The fourth holder 1800 and the third holder 1700 are rotatably connected. The fourth holder 1800 in an actuated state can rotate in a direction parallel to a support plane 1710 of the third holder 1700. In other words, the rotatable connection between the fourth holder 1800 and the third holder 1700 is a tight connection. A relative rotation between the fourth holder and the third holder can be implemented under external force. The plurality of lenses 810 of the four-lens adjustable camera are all arranged in a plane where the support plane 1710 is located. The lens 810 rotates in a direction parallel to the support plane 1710, which is called an adjustment of the lens 810 in P direction.

Specifically, one of the support plane 1710 of the third holder 1700 and a surface on the fourth holder 1800 opposite to the support plane is provided with a third tooth slot, and the other is provided with a third engaging tooth. The third engaging tooth is elastically engaged with the third tooth slot in the rotation direction of the fourth holder 1800. Specifically, the support plane 1710 may be provided with a third engaging tooth 1720, and the fourth holder 1800 may be provided with a third tooth slot 1810. Of course, the third engaging tooth 1720 may be provided on the fourth holder 1800, and accordingly, the third tooth slot 1810 is provided on the support plane 1710 of the third holder 1700.

Herein, the elastic engagement means that an engaging tooth and a tooth slot maintains in a fixed connection state without external force; the fixed connection of the engaging tooth and the tooth slot is released due to deformation under the external force, so as to cause them to rotate relative to each other; and after the external force disappears, the engaging tooth and the tooth slot restores to the fixed connection state.

In the embodiment of the present application, the third holder 1700 and the fourth holder 1800 are elastically engaged through the third engaging tooth 1720 and the third tooth slot 1810. In an adjustment process, an operator applies a certain force to actuate the third holder 1700 to rotate. In the rotation process of the third holder 1700, the third tooth slot 1810 and the third engaging tooth 1720 rotate relative to each other. After the adjustment ends (the external force disappears), the engagement between the third tooth slot 1810 and the third engaging tooth 1720 can ensure that the third holder 1700 is positioned at an adjusted position. Eventually, the adjustment of lens 810 in P direction is completed.

It can be known from the process above, the third holder 1700 and the fourth holder 1800 are elastically engaged through the third engaging tooth 1720 and the third tooth slot 1810. In the adjustment of the lens 810 in P direction, the operator is only required to rotate the fourth holder 1800, without performing unscrewing and screwing operations described in background. This makes the operation of lens 810 in P direction easy, that is, the operator is just required to perform an operation. Apparently, the structure of the lens adjustment device can improve the adjustment efficiency of the lens 810.

Figure 17:
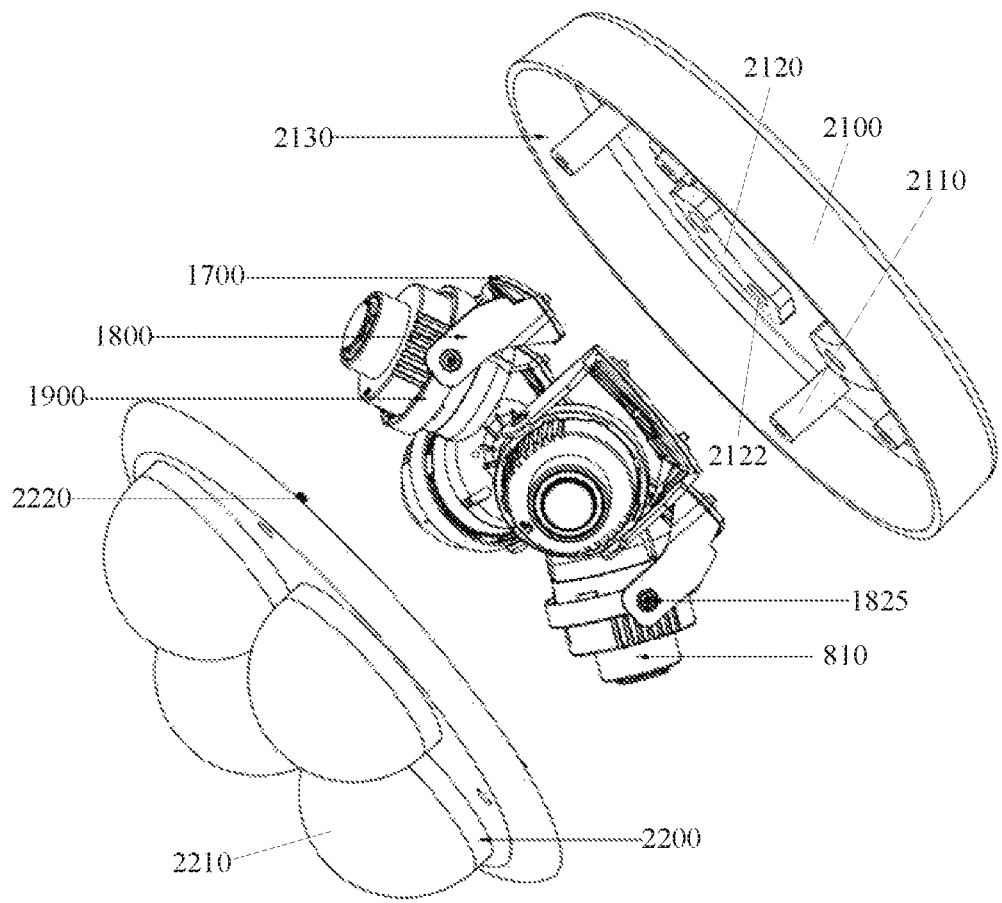
FIG. 17 is an exploded diagram of the four-lens adjustable camera according to an embodiment of the present application.

Referring to FIG. 17 and FIG. 23 again, there may be a plurality of third holders 1700. Each of the fourth holders 1800 may be mounted on a corresponding third holder 1700. In a specific implementation, one of the fourth holders 1800 is mounted on each of the third holders 1700. Of course, there may be one third holder 1700. All of the fourth holders 1800 may be mounted on the third holder 1700. To reduce the weight, a plurality of lightening holes 1760 may be disposed on the third holder 1700.

In the embodiment, the fourth holders 1800 may include two support arms 1820 and a connection plate 1830. The connection plate 1830 is connected with the two support arms 1820 configured for supporting the lens 810. In a specific implementation, the connection plate 1830 and the two support arms 1820 may form an integrated unit. A connection hole 1813a may be disposed on the connection plate 1813. A plurality of first snaps 1730 may be disposed on the third holder 1700. The plurality of first snaps 1730 connection with the connection plate 1813 through a connection hole 1831. The plurality of first snaps 1730 can implement the connection between the third holder 1700 and the fourth holder 1800, and meanwhile can also provide a rotation basis for the rotation of the fourth holders 1800. In this case, two support arms 1820 rotate relative to the third holder 1700 via the connection plate 1830, so that two support arms 1820 cause the lens 810 to rotate relative to the third holder 1700. Of course, the rotatable connection between the third holder 1700 and the fourth holder 1800 in the tight connection may be implemented by using other manners.

In a specific implementation, a surface on the connection plate 1830, which is opposite to the third holder 1700, is provided with a plurality of third tooth slots 1810. The plurality of third tooth slots 1810 are distributed along a circumference centered on an axis of the connection hole 1831.

In order to avoid an error operation of the fourth holder 1800 under a small interference, in an optional scheme, at least one of a surface of the four holder 1800 and a surface of the third holder 1700 opposite to the surface of the four holder is provided with a tension portion that can be tension-attached to the other surface. Specifically, the tension portion may include a first tension projection and/or a third elastic arm 1740. The tension portion takes a tension effect to enable the fourth holder 1800 to be actuated by a larger force. In this case, the fourth holder 1800 will not randomly rotate under small interference. To improve the connection effect, the third engaging tooth 1720 is provided on the third elastic arm 1740. The third engaging tooth 1720 is stably engaged with the third tooth slot 1810 by means of an elastic force applied by the third elastic arm 1740.

In the lens adjustment device disclosed in the embodiment of the present application, a fifth holder 1900 may be disposed on the fourth holder 1800. The fifth holder 1900 is rotatably connected with the lens 810 and enables the lens 810 to rotate around its axis, to achieve the purpose of adjusting the lens 810, that is, the adjustment of the lens 810 in R direction.

The fifth holder 1900 may be rotatably provided on the fourth holder 1800, and can rotate in the direction perpendicular to the support plane 1710 of the third holder 1700, so that the fifth holder 1900 causes the lens 810 to perform pitching motion relative to the support plane 1710. Eventually, a rotation adjustment of the lens 810 in the direction perpendicular to the support plane 1710, that is, an adjustment in T direction is implemented.

As described above, the fourth holder 1800 may include the support arm 1820. To improve the flexibility of the adjustment, the fifth holder 1900 may include a tension disk 1910 that is movably connected with the support arm 1820. The tension disk 1910 includes a tension zone. One of the tension zone and the support arm 1820 is provided with a second tension projection, and the other is provided with a plurality of tension slots 1911 that extend radially along the tension disk 1910. The tension slots 1911 engage with the second tension projection.

In a specific implementation, the tension slots 1911 are provided on the tension disk 1910, and a fourth tension projection 1821 is provided on the support arm 1820. The fourth tension projection 1821 and the tension slots 1911 can rotate relative to each other with the rotation of the fourth holder 1800. It should be noted that the engagement between the tension slots 1911 and the fourth tension projection 1821 is an elastic engagement. The fourth tension projection 1821 and the tension slots 1911 are positioned when the fifth holder 1900 is not subjected to external force, to ensure that the lens 810 is maintained in a certain position. When the fifth holder 1900 is subjected to external force, the engagement between the fourth tension projection 1821 and the tension slots 1911 is released due to the elastic deformation, so as to enable them to rotate relative to each other.

In an actual application, the lens 810 is only required to rotate relative to the fourth holder 1800 within a set angle range. Based on this, referring to FIG. 20, the support arm 1820 may be provided with a third restriction portion 1822, and the tension disk 1910 is provided with a fourth restriction portion 1912. The fourth restriction portion 1912 can be restriction-connected with the third restriction portion 1822 in the rotation direction of the tension disk 1910.

Figure 20:
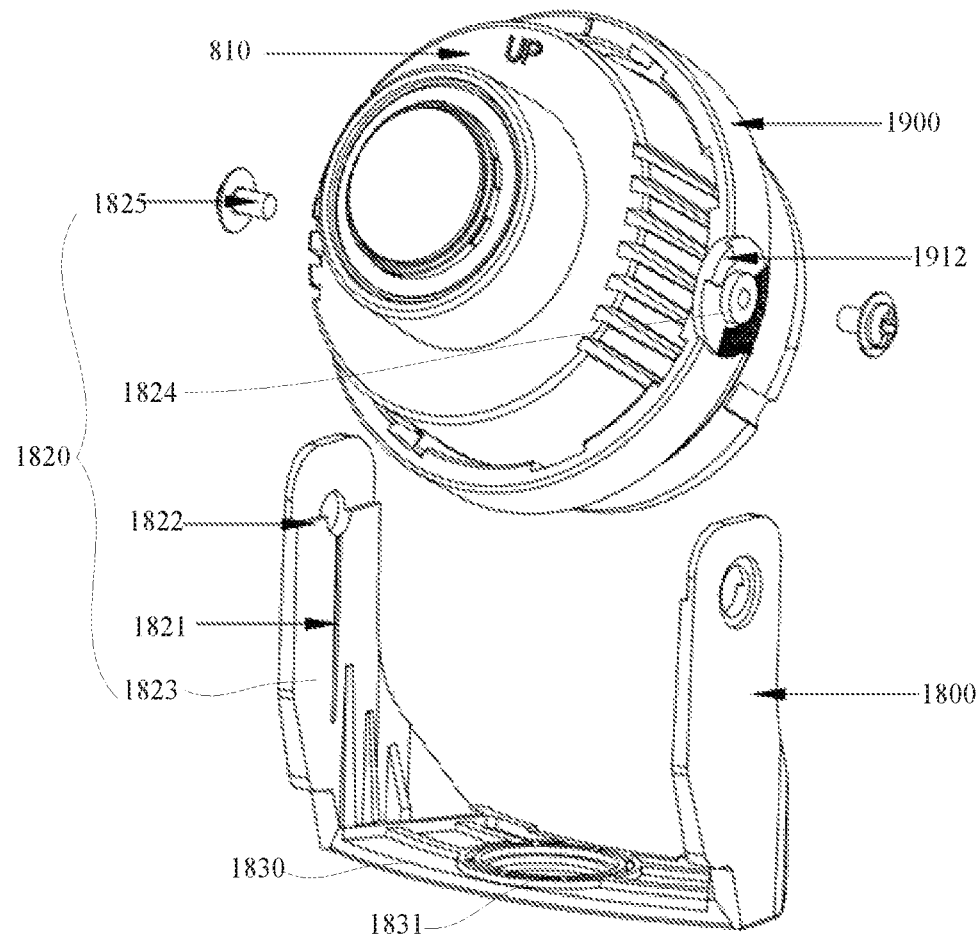
FIG. 20 is an exploded diagram of a second holder and a lens in the four-adjustable camera according to an embodiment of the present application.
Figure 21:
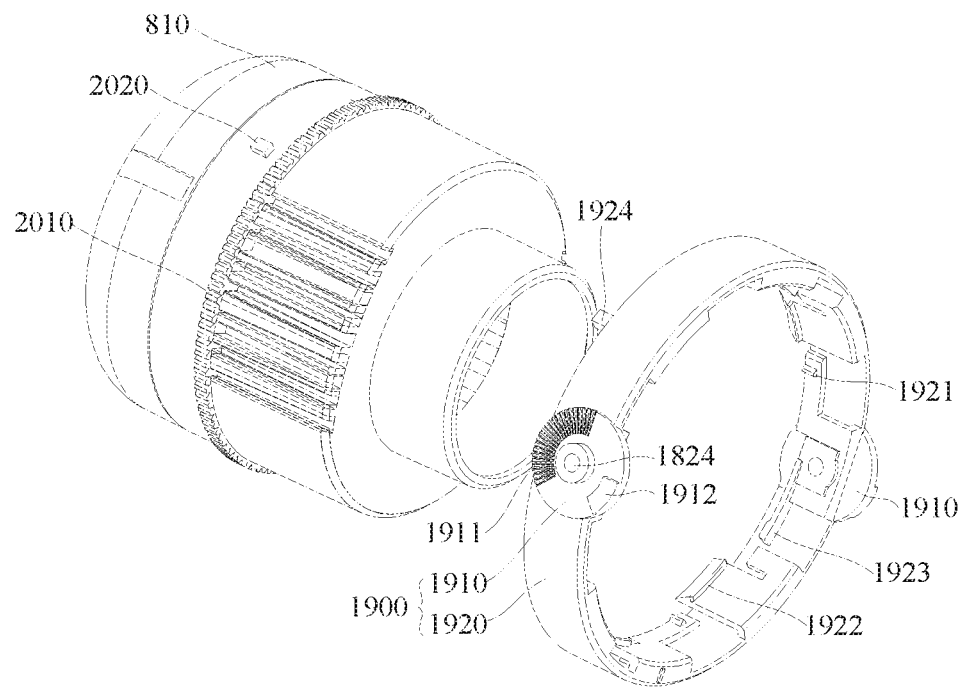
FIG. 21 is an exploded diagram of a third holder and a lens in the four-adjustable camera according to an embodiment of the present application.
Figure 22:
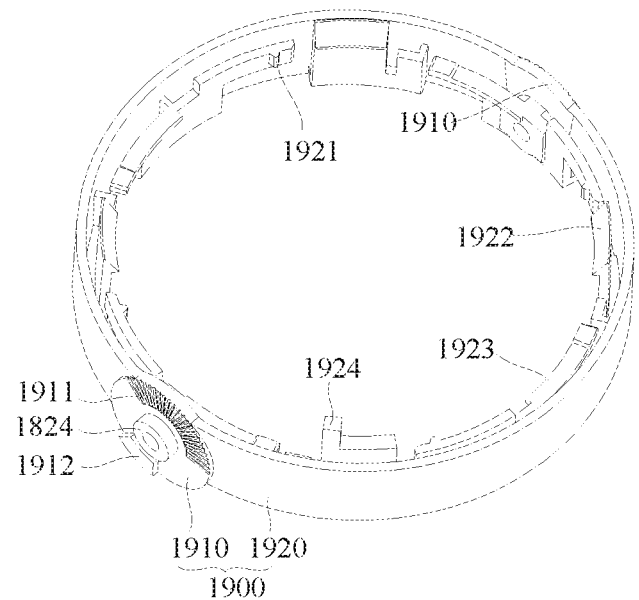
FIG. 22 is a structural diagram of a third holder in the four-adjustable camera according to an embodiment of the present application.

Referring to FIG. 20, in a specific implementation, the support arm 1820 may include a support arm body 1823 and a fixed block 1824 fixed on the support arm body 1823. The fixed block 1824 is movably connected with the tension disk 1910, so as to enable the relative rotation therebetween. The fixed block 1824 and the tension disk 1910 may be fixed on the support arm body 1823 via a first screw 1825. The scheme rotates the lens 810 relative to the support arm 1820 through a rotatable connection between the fixed block 1824 and the tension disk 1910.

In order to improve the stability of the rotation of the lens 810, in an optional scheme, there may be two support arms 1820. The two support arms 1820 are respectively arranged at two sides of the fifth holder 1900.

Referring to FIGS. 17, 21 and 22 again, the fifth holder 1900 may include a circular member 1920. The circular member 1920 is movably connected with the lens 810, so as to enable the lens 810 to rotate around its axis. The tension disk 1910 may be provided on the circular member 1920. One of the circular member 1920 and the lens 810 is provided with a fourth tooth slot and the other is provided with a fourth engaging tooth that engages with the fourth tooth. The fourth engaging tooth rotates relative to the fourth tooth slot in the circumferential direction of the lens 810. Specifically, the fourth tooth slot 410 may be provided on the lens 810, and accordingly, the fourth engaging tooth 1921 may be provided on the circular member 1920.

A second snap 1922 and a protuberance 1923 may be provided on an inner wall of the circular member 1920. The protuberance 1923 is fixedly connected with one end of the fourth engaging tooth 1921 or the fourth tooth slot 2010 on the lens 810 in a set direction, so that the circular member 1920 can't move relative to the lens 810 in the set direction. The second snap 1922 is connected with the other end of the fourth engaging tooth 1921 or the fourth tooth slot 2010 on the lens 810, so as to enable the positioning of the lens 810 and the circular member 1920 in the axial direction of the circular member 1920. It should be noted that the set direction is the axis direction of the lens 810.

Specifically, the protuberance 1923 may be a third elastic arm perpendicular to the inner wall of the fifth holder 1900. The third elastic arm is tension-connected with one end of the fourth engaging tooth 1921 or the fourth tooth slot 2010.

In an actual application, the lens 810 usually rotates around its axis in a certain angle range, without rotating around its axis in the angle range of 360°. Based on this, referring to FIGS. 21-22 again, in an optional scheme, the circular member 1920 may be provided with a third restriction portion 1924, and the lens 810 may be provided with a fourth restriction portion 2020. The third restriction portion 1924 and the fourth restriction portion 2020 are restriction-connected in the direction of the lens 810 rotating around its axis. The restriction connection between the third restriction portion 1924 and the fourth restriction portion 2020 can enable the lens 810 to rotate within a required angle range.

Based on the lens adjustment device disclosed in the embodiment of the present application, the embodiment of the present application discloses a four-lens adjustable camera. The disclosed four-lens adjustable camera includes the lens 810 and the lens adjustment device according to the embodiment. The lens 810 is mounted on the lens adjustment device.

The four-lens adjustable camera disclosed in the embodiment of the present application includes a body 2100 and a transparent cover 2200. The lens adjustment device is mounted in a cavity formed by the transparent cover 2200 and the body 2100. The lens adjustment device is fixedly connected with the body 2100. The transparent cover takes a good protection effect. Specifically, the transparent cover 2200 may include curved surface portions 2210. Each curved surface portion 2210 is covered on one lens 810. The curved surface portions 2210 can improve the deformation resistance of the whole transparent cover, and thus improve the explosion-proof performance of the four-lens adjustable camera.

Figure 23:
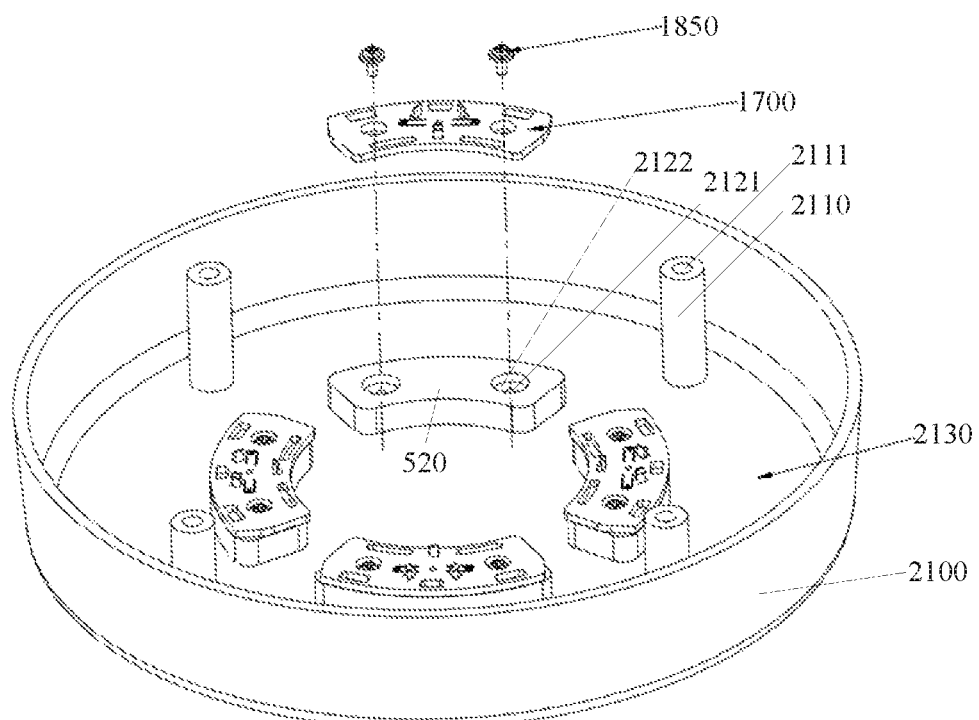
FIG. 23 is a diagram of a connection between a body and the first holder in the four-lens adjustable camera according to an embodiment of the present application.
Figure 24:
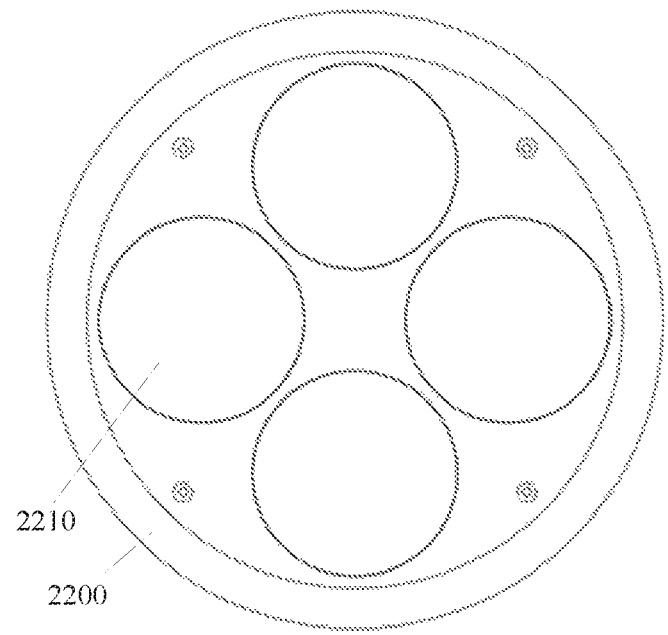
FIG. 24 is a structural diagram of a transparent cover in the four-lens adjustable camera according to an embodiment of the present application.

In the embodiment of the application, the transparent cover 2200 may be fixedly connected with the body 2100 via a third screw 2220. Specifically, a connection post 2110 may be provided in the body 2100. A screw hole 2111 is disposed on the connection post 2110. The third screw 2220 is fixedly connected with the screw hole through the transparent cover 2200, so as to enable a fixed connection between the transparent cover 2200 and the body 2100. As shown in FIG. 23, the body 2100 may include a receiving space 2130. The connection post 2110 is received in the receiving space 2130. To implement a good connection, one end of the connection post 2110 at which the screw hole is disposed may be aligned with a top opening of the receiving space 2130.

A mount base 2120 may be provided on a bottom wall of the receiving space 2130. The third holder 1700 is mounted in the mount base 2120 in one-to-one correspondence. Specifically, there may be a plurality of mount bases 2120. The plurality of mount bases 2120 are fixedly connected to form an annular base. Such a structure is convenient for mounting the plurality of mount bases 2120, but it will increase the weight of the body 2100. In view of this, in an optional solution, the plurality of mount bases 2120 are arranged separately. Each mount base 2120 is arranged in correspondence to one third holder 1700. This will undoubtedly ensure that the third holder 1700 can be mounted with less material consumption.

Figure 18:
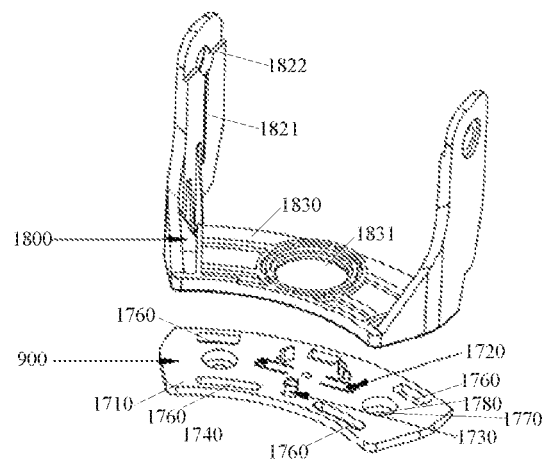
FIG. 18 and FIG. 19 are respectively exploded diagrams at different viewing angles of the first holder and the second holder in the four-lens adjustable camera according to an embodiment of the present application.

A connection hole 1770 may be provided on the third holder 1700, and a screw hole 2121 may be provided on the mount base 2120. The connection hole 1770 may be fixedly connected to the screw hole 2121 via the second screw 1750. To improve the compactness of the assembly, in an optional scheme, one end of the connection hole 1770 facing away from the screw hole 2121 may include a receiving slot 1780. As shown in FIG. 18, the receiving slot 1780 receives a nut of the second screw 1750. Such an arrangement can place the nut well, and thus can avoid that the nut impacts the rotation.

Figure 19:
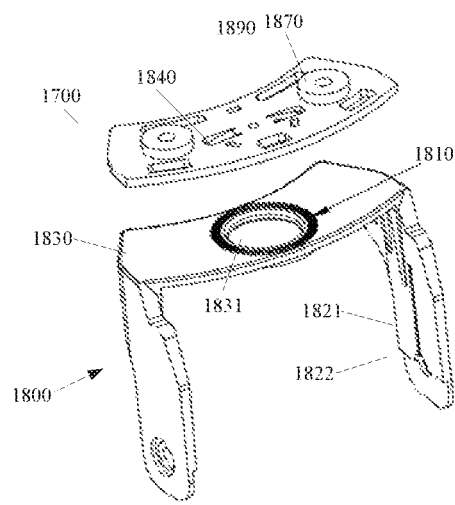

For ease of assembly, one of the third holder 1700 and the mount base 2120 may be provided with a positioning projection 1790, and the other may be provided with a positioning slot 2122. The positioning projection 1790 is fixedly connected with the positioning slot 2122. In a specific implementation, as shown in FIG. 19 and FIG. 23, the positioning projection 1790 is provided on the third holder 1700, and the positioning slot 2122 is provided on the mount base 2120. There may be one or more positioning projections 1790 and positioning slots 2122. In case there are multiple positioning projections and positioning slots, it can better implement the positioning. In a specific implementation, the number of the positioning projections 1790 may be two, and the number of the positioning slots 2122 may be two.

In an optional embodiment, the connection hole 1770 can pass through the third holder 1700 and the positioning projection 1790. A screw hole 2121 may be provided at the bottom of the positioning slot 2122. Such a structure can be convenient for positioning and connection operations between the third holder 1700 and the mount base 2120.

An embodiment of the present application further provides a computer program product including instructions. The program product is run on a computer so as to cause the computer to perform any one of the methods for controlling an infrared lamp according to the above embodiments.

The embodiments can be fully or partially implemented via software, hardware, firmware or combination thereof. When implemented via software, the embodiments can be fully or partially implemented in the form of the computer program product. The computer program product includes one or more computer instructions. Workflows or functions according to the embodiments of the present application are fully or partially generated when the computer program instructions are loaded and executed on the computer. The computer may be a general-purpose computer, a special-purpose computer, a computer network, or other programmable devices. The computer instructions may be stored in a computer-readable storage medium or transmitted from a computer-readable storage medium to another computer-readable storage medium. For example, the computer instructions can be transmitted from a network station, a computer, a server or a data center to another network station, another computer, another server or another data center in a wired (for example, coaxial cable, fiber, DSL) or wireless (for example, infrared, wireless, microwave and like) manner. The computer-readable storage medium may be any available medium that can be accessed by the computer or a data storage device including a server, a data center, and the like integrated with one or more available mediums. The available mediums may be a magnetic medium (for example, a floppy disk, a hard disk, a magnetic tape), an optical medium (for example, a DVD), or a semiconductor medium (for example, Solid State Disk (SSD)) or the like.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the four-lens adjustable camera and the computer programs product are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for controlling an infrared lamp, which is applied to a four-lens adjustable camera, comprising:
    determining, for each of a plurality of lenses of the four-lens adjustable camera, wherein each lens captures a picture different from any other lens of the four-lens adjustable camera by association of that lens with an image sensor for that lens, a brightness change rate between a picture captured by the lens when a first infrared lamp group is not turned on and a picture captured by the lens when the first infrared lamp group is turned on, the first infrared lamp group being one infrared lamp group of a plurality of lamp groups in the four-lens adjustable camera; and
    determining a lens with a largest brightness change rate among the plurality of lenses based on the determined brightness change rates as a lens corresponding to the first infrared lamp group, so that the first infrared lamp group performs infrared lamp light compensation for the determined lens, rather than another lens among the lenses.

2. The method according to claim 1, wherein the step of determining, for each of a plurality of lenses of the four-lens adjustable camera, a brightness change rate between a picture captured by the lens when a first infrared lamp group is not turned on and a picture captured by the lens when the first infrared lamp group is turned on, comprises:

turning off all infrared lamp groups in the four-lens adjustable camera;

determining, for each of the plurality of lenses, a brightness of a picture captured by the lens when all of the infrared lamp groups are not turned on as a brightness without light compensation of the lens;

turning on the first infrared lamp group;

determining, for each of the plurality of lenses, a brightness of a picture captured by the lens when the first infrared lamp group is turned on as a brightness with light compensation of the lens; and calculating, for each of the plurality of lenses, a change rate of the brightness with light compensation of the lens relative to the brightness without light compensation of the lens as a brightness change rate of the lens.

3. The method according to claim 2, wherein, after determining, for each of the plurality of lenses, the brightness of the picture captured by the lens when all of the infrared lamp groups are not turned on as the brightness without light compensation of the lens, the method further comprises:

calculating, for each of the plurality of lenses, a variance of the brightness of the picture captured by the lens in unit time when all of the infrared lamp groups are not turned on as a brightness variance without light compensation of the lens;

initializing the plurality of lenses and performing the step of turning off all infrared lamp groups in the four-lens adjustable camera if a lens whose brightness variance without light compensation is larger than a first preset variance threshold exists among the plurality of lenses; and continuing to perform the step of turning on the first infrared lamp group if no lens whose brightness variance without light compensation is larger than the first preset variance threshold exists among the plurality of lenses.

4. The method according to claim 2, wherein, after determining, for each of the plurality of lenses, the brightness of the picture captured by the lens when the first infrared lamp group is turned on as the brightness with light compensation of the lens, the method further comprises:

calculating, for each of the plurality of lenses, a variance of the brightness of the picture captured by the lens in unit time when the first infrared lamp group is turned on as a brightness variance with light compensation of the lens;

initializing the plurality of lenses and performing the step of turning off all infrared lamp groups in the four-lens adjustable camera if a lens whose brightness variance with light compensation is larger than a second preset variance threshold exists among the plurality of lenses; and continuing to perform the step of calculating, for each of the plurality of lenses, a change rate of the brightness with light compensation of the lens relative to the brightness without light compensation of the lens as a brightness change rate of the lens, if no lens whose brightness variance with light compensation is larger than the second preset variance threshold exists among the plurality of lenses.

5. The method according to claim 1, wherein, after determining, for each of the plurality of lenses of the four-lens adjustable camera, the brightness change rate between the picture captured by the lens when the first infrared lamp group is not turned on and the picture captured by the lens when the first infrared lamp group is turned on, the method further comprises:

determining whether a largest brightness change rate of the brightness change rates of the plurality of lenses is larger than a sum of a smallest brightness change rate and a second smallest brightness change rate of the brightness change rates;

if the largest brightness change rate is larger than the sum of the smallest brightness change rate and the second smallest brightness change rate, initializing the plurality of lenses and performing the step of determining, for each of a plurality of lenses of the four-lens adjustable camera, a brightness change rate between a picture captured by the lens when a first infrared lamp group is not turned on and a picture captured by the lens when the first infrared lamp group is turned on; and if the largest brightness change rate is not larger than the sum of the smallest brightness change rate and the second smallest brightness change rate, continuing to perform the step of determining a lens with a largest brightness change rate among the plurality of lenses as a lens bound to the first infrared lamp group.

6. The method according to claim 3, wherein, initializing the plurality of lenses comprises:

stowing infrared filters of the plurality of lenses; and initializing gains and shutter speeds of the plurality of lenses.

7. The method according to claim 2, wherein, the step of determining, for each of the plurality of lenses, a brightness of a picture captured by the lens when all infrared lamp groups are not turned on as a brightness without light compensation of the lens, comprises:

determining, for each of the plurality of lenses, an average brightness of all bayer image frames captured by the lens in unit time when all of the infrared lamp groups are not turned on as the brightness without light compensation of the lens;

the step of determining, for each of the plurality of lenses, a brightness of a picture captured by the lens when the first infrared lamp group is turned on as a brightness with light compensation of the lens, comprises:

determining, for each of the plurality of lenses, an average brightness of all bayer image frames captured by the lens in unit time when the first infrared lamp group is turned on as the brightness with light compensation of the lens.

8. A four-lens adjustable camera, comprising:

four lenses, four infrared lamp groups, a master processor, a slave processor, and an exchanging module, wherein, the four lenses are movably mounted to the four-lens adjustable camera, two of the four lenses are electrically connected to the master processor, and the other two lenses are electrically connected to the slave processor;

two of the four infrared lamp groups are electrically connected to the master processor, and the other two infrared lamp groups are electrically connected to the slave processor;

the exchanging module is electrically connected to the master processor and the slave processor and is configured to exchange information between the master processor and the slave processor;

the master processor is configured to control the two lenses and the two infrared lamp groups electrically connected to the master processor, and send a control instruction to the slave processor; the slave processor is configured to control the two lenses and the two infrared lamp groups electrically connected to the slave processor according to the control instruction; and the master processor is further configured to control the four-lens adjustable camera to perform the following steps:

determining, for each of the four lenses, a brightness of a picture captured by the lens when the four infrared lamp groups are not turned on as a brightness without light compensation of the lens;

determining, for each of the four lenses, a brightness of a picture captured by the lens when only a first infrared lamp group among the four infrared lamp groups is turned on as a brightness with light compensation of the lens, the first infrared lamp group being one of the four infrared lamp groups;

calculating, for each of the four lenses, a change rate of the brightness with light compensation of the lens relative to the brightness without light compensation of the lens as a brightness change rate of the lens; and determining a lens with a largest brightness change rate among the four lenses as a lens bound to the first infrared lamp group.

9. A four-lens adjustable camera, comprising:

four lenses, four infrared lamp groups, and a control apparatus, wherein:

the four lenses are movably mounted into the four-lens adjustable camera;

the four infrared lamp groups are configured to perform infrared light compensation on the four lenses; and the control apparatus comprises at least one processor for controlling the four-lens adjustable camera, wherein the at least one processor is configured to:

determine, for each of a plurality of lenses of the four-lens adjustable camera, wherein each lens captures a picture different from any other lens of the four-lens adjustable camera by association of that lens with an image sensor for that lens, a brightness change rate between a picture captured by the lens when a first infrared lamp group is not turned on and a picture captured by the lens when the first infrared lamp group is turned on, the first infrared lamp group being one infrared lamp group of a plurality of lamp groups in the four-lens adjustable camera;

determine a lens with a largest brightness change rate among the plurality of lenses based on the determined brightness change rates as a lens corresponding to the first infrared lamp group, so that the first infrared lamp group performs infrared lamp light compensation for the determined lens, rather than another lens among the lenses;

determine whether the four infrared lamp groups are turned on according to working modes of the four lenses and a corresponding relationship between the four lenses and the infrared lamp groups, to obtain a determination result for the four infrared lamp groups; and control the turn-on and turn-off of the four infrared lamp groups according to the determination result.

\* \* \* \* \*